United States Patent
Yajnanarayana et al.

(10) Patent No.: US 12,256,272 B2
(45) Date of Patent: Mar. 18, 2025

(54) NETWORK NODES AND METHODS PERFORMED THEREIN FOR SUPPORTING HANDOVER OF A WIRELESS DEVICE

(71) Applicant: Telefonaktiebolaget LM Ericsson (publ), Stockholm (SE)

(72) Inventors: Vijaya Parampalli Yajnanarayana, Bangalore (IN); Henrik Rydén, Solna (SE); László Hévizi, Piliscsaba (HU); Ankit Jauhari, Bangalore (IN); Mirsad Cirkic, Linköping (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 433 days.

(21) Appl. No.: 17/426,034

(22) PCT Filed: Jan. 31, 2020

(86) PCT No.: PCT/SE2020/050092
§ 371 (c)(1),
(2) Date: Jul. 27, 2021

(87) PCT Pub. No.: WO2020/159430
PCT Pub. Date: Aug. 6, 2020

(65) Prior Publication Data
US 2022/0303843 A1 Sep. 22, 2022

(30) Foreign Application Priority Data
Jan. 31, 2019 (IN) .............................. 201911003917

(51) Int. Cl.
*H04W 36/00* (2009.01)
*H04W 36/32* (2009.01)

(52) U.S. Cl.
CPC . *H04W 36/0033* (2013.01); *H04W 36/00835* (2018.08); *H04W 36/008375* (2023.05); *H04W 36/322* (2023.05); *H04W 36/324* (2023.05)

(58) Field of Classification Search
None
See application file for complete search history.

(56) References Cited

U.S. PATENT DOCUMENTS

| | | | | |
|---|---|---|---|---|
| 6,108,374 A | * | 8/2000 | Balachandran | H04L 1/0009 375/227 |
| 9,014,040 B1 | | 4/2015 | Naim et al. | |
| 2006/0227744 A1 | * | 10/2006 | Metke | H04W 36/32 370/331 |
| 2008/0311915 A1 | * | 12/2008 | Lim | H04W 36/32 455/436 |

(Continued)

OTHER PUBLICATIONS

Leu et al. "Modeling and Analysis of Fast Handoff Algorithms for Microcellular Networks"; Dept. of Electrical and Computer Engineering; George Mason University; Fairfax, Virginia; Proceedings of the 10th IEEE Int'l Symp. on Modeling, Analysis, & Simulation of Computer & Telecommunications Systems; 1526-7539/02; 2002, consisting of 8-pages.

(Continued)

*Primary Examiner* — Ricky Q Ngo
*Assistant Examiner* — Kabir U Jahangir
(74) *Attorney, Agent, or Firm* — Weisberg I.P. Law, P.A.

(57) ABSTRACT

The present disclosure provides relates to methods and apparatus for handover optimization in a 5G context using reinforcement learning (RL). In contrast to the conventional handover methods, handovers between base-stations (BSs) are controlled using a centralized RL-based machine learning (ML) agent. This ML agent handles the radio measurement reports from the UEs and chooses appropriate handover actions in accordance with the RL machine learning framework to maximize a long-term utility.

19 Claims, 23 Drawing Sheets

(56) References Cited

U.S. PATENT DOCUMENTS

| | | | | |
|---|---|---|---|---|
| 2010/0124924 | A1* | 5/2010 | Cheng | H04W 36/36 455/434 |
| 2012/0009938 | A1 | 1/2012 | Liu et al. | |
| 2013/0029670 | A1* | 1/2013 | Lee | H04W 36/08 455/444 |
| 2013/0031036 | A1* | 1/2013 | Kojima | G06N 20/00 706/12 |
| 2013/0090116 | A1* | 4/2013 | Lim | H04W 48/12 455/434 |
| 2015/0016312 | A1 | 1/2015 | Li et al. | |
| 2015/0365976 | A1 | 12/2015 | Lee et al. | |
| 2017/0311355 | A1 | 10/2017 | Yi et al. | |
| 2018/0220340 | A1 | 8/2018 | Ramachandra et al. | |
| 2018/0241591 | A1* | 8/2018 | Rekaya-Ben Othman | H04B 7/0697 |
| 2018/0324653 | A1 | 11/2018 | Nagaraja et al. | |
| 2018/0376390 | A1* | 12/2018 | Gemelos | H04W 36/0094 |
| 2019/0007883 | A1* | 1/2019 | Dang | H04W 36/245 |
| 2020/0112899 | A1* | 4/2020 | Mysore Annaiah | H04W 36/08 |

OTHER PUBLICATIONS

Leu et al. "An Efficient Timer-based Hard Handoff Algorithm for Cellular Networks"; Dept. of Electrical and Computer Engineering; George Mason University; Fairfax, Virginia; 0-7803-7700-1/03; 2003, pp. 1207-1212, consisting of 6-pages.

Wu et al. "Handover Scheme in LTE-based Networks with Hybrid Access Mode Femtocells" Department of Innovative Information and Technology, Tamkang University; Department of Information Management, Jinwen University of Science and Technology; Journal of Convergence Information Technology, vol. 6 No. 7, Jul. 2011, consisting of 11 pages.

Luan et al. "Optimization of Handover Algorithms in LTE High-speed Railway networks"; Laboratory of Network System Architecture and Convergence; Beijing University of Posts and Telecommunications; International Journal of Digital Content Technology and its Applications, vol. 6, No. 5, Mar. 2012, consisting of 9 pages.

Lin et al. "5G New Radio: Unveiling The Essentials of the Next Generation Wireless Access Technology" 2471-2825/19 IEEE Communications Standards Magazine, Sep. 2019, consisting of 8 pages.

International Telecommunications Unit; "Guidelines for evaluation of radio interface technologies for IMT-Advanced"; Report ITU-R M.2135; 2008, consisting of 67 pages.

3GPP TS 36.331 V12.2.0; 3rd Generation Partnership Project; Technical Specification Group Radio Access Network Evolved Universal Terrestrial Radio Access (E-UTRA); Radio Resource Control (RRC); Protocol specification (Release 12); Jun. 2014, consisting of 365 pages.

International Search Report and Written Opinion dated Apr. 3, 2020 for International Application No. PCT/SE2020/050092 filed Jan. 31, 2020, consisting of 11 pages.

* cited by examiner

NETWORK NODES AND METHODS PERFORMED THEREIN FOR SUPPORTING HANDOVER OF A WIRELESS DEVICE

CROSS-REFERENCE TO RELATED APPLICATIONS

This application is a Submission Under 35 U.S.C. § 371 for U.S. National Stage Patent Application of International Application No.: PCT/SE2020/050092, filed Jan. 31, 2020 entitled "NETWORK NODES AND METHODS PERFORMED THEREIN FOR SUPPORTING HANDOVER OF A WIRELESS DEVICE," which claims priority to Indian Patent Application No.: 201911003917, filed Jan. 31, 2019, the entireties of both of which are incorporated herein by reference.

TECHNICAL FIELD

The present disclosure relates generally to handover procedures for wireless communication networks and, more particularly, to use of machine learning to improve decision making in handover procedures.

BACKGROUND

One of the common ways to increase the capacity and coverage of a cellular system with a limited frequency spectrum is by partitioning the network coverage area into cells such that neighbor cells reuse the frequencies. In these systems, support mobility is supported by a handover mechanism that enables user equipment (UEs), also called wireless devices, to seamlessly move in the coverage area of the network. The handover mechanism involves reassigning an ongoing connection handled by one cell to another cell. A UE is either in an idle mode or a connected mode. In idle mode, the UE camps on a cell and does not have any active signaling or data-bearers to the base stations (cells). In connected mode, the base stations (cells) allocate resources to the UEs and there is active signaling on the data and control channels.

In cellular networks, a UE continuously monitors the signal strength of the serving and neighboring cells and reports the signal strength measurements to the base stations. The signal strength measurements are typically made on downlink reference signals. As a UE near a cell edge moves away from the serving cell, the reference signal received power (RSRP) of the serving cell decreases and the RSRP of the neighboring cell increases. When the RSRP of the serving cell drops below an acceptable level and the RSRP of the neighboring cell RSRP exceeds the RSRP of the serving cell by a predetermined threshold (i.e., hysteresis-value), the serving base-station initiates a handover. Hysteresis is used to overcome the ping-pong effect in handovers.

With the evolution of Fifth Generation (5G) network, the radio frequency (RF) environment of the cellular system has changed significantly rendering the conventional handover methods sub-optimal. Various 5G deployments are possible including stand-alone (SA) and non-standalone (NSA). In the NSA deployment, Long-Term Evolution (LTE) is used for cell acquisition tasks, such as initial access and synchronization. LTE is also used for control signaling whenever the UE is able to use New Radio (NR) for a data transmission.

In NSA deployments, the beams carrying the LTE reference signals used for cell acquisition have large beam-width and are always-on beams, while the beams used to carry data have a narrow beam-width. In this disclosure, the large beam-width beams used for cell acquisition and reference signal measurement are referred to as access beams and the narrow beam-width beams for carrying data are referred to as link beams. The frequency of access beams is typically in the 0-10 GHz range, while the narrow data link beam could be in the mmWave band. Similarly, in NR standalone deployments, when the network has high beamforming capabilities (e.g., at mmWave), the network uses much wider access beams in comparison to link-beams. The wide access beams are measured at the UE and reported to the network for handover decisions. In these deployment scenarios, the signal strength measurements made on access beams used to make handover decisions do not provide detail on the coverage provided by the link beams.

Also, in NR networks there is possibility to report measurements made on more narrow beams using the network transmitted channel state information reference signals (CSI-RS), however, the amount of reporting increases using CSI-RS and thus less available resources for regular data transmissions. Also, when the network performs reciprocity-based beamforming, the link-beam quality cannot be estimated until the UE has initiated connection to the new node.

Another major drawback of existing methods is that they are oblivious to the long-term performance, the handover decisions are taken based on the instantaneous measurements done over short interval, and there is no feedback on how good or bad the choice of a handover action was.

SUMMARY

The present disclosure provides relates to methods and apparatus for handover optimization in a 5G context using reinforcement learning (RL). In contrast to the conventional handover methods, handovers between base-stations (BSs) are controlled using a centralized RL-based machine learning (ML) agent. This ML agent handles the radio measurement reports from the UEs and chooses appropriate handover actions in accordance with the RL machine learning framework to maximize a long-term utility.

In one embodiment, the RL-based handover is modeled as a contextual multi-arm bandit problem where the goal is to select an action that maximizes an expected gain. In this model, the radio environment of the UE serves as the context, the action is the decision on the handover target, and the value/reward is the expected gain or utility of the handover to the selected target. During a training phase, the ML agent learns what actions produce the largest gains and generates a mapping between the context and, the handover decisions that produce the "best" results. The mappings generated by applying RL-based learning are applied during an active phase to make handover decisions.

The expected gain can be based on one or more metrics including downlink throughput, uplink throughput, the reference signal received power (RSRP) if the link beam, the reference signal received quality (RSRQ) of the link beam, and the packet drop rate. In order for the serving node to update its expected gain for the selected arm, the target node should report the gain to the serving node after handover. In order update the expected gain for a selected arm, the target node or UE should report the gain to the serving node after handover.

The expected gain (utility) for each arm is calculated based on the UE context. The context information can include the measured RSRP of the access beams for serving base stations and target base stations, the UE location, the traffic type of data transmission to or from the UE, and latency or other the Quality of Service (QoS) requirements. The context may also include information about the target base stations such as the antenna configuration of the target base station (which indicates its beam forming capabilities) the resource utilization of the target base station and the carrier frequencies used by the target base station.

The mapping from the context to the expected gain can be estimated using machine learning. Examples of machine learning approaches include neural networks, random forests, nearest neighbor, and Q-table.

The use of RL-based handovers provides significant gain in the link beam performance compared to the traditional handover algorithm based on access-beam with 3 dB hysteresis.

DETAILED DESCRIPTION

The present disclosure describes methods and apparatus for handover in wireless communication networks, which are also referred to as cellular networks. While handover methods and apparatus will be described in the context of a 5G network, those skilled in the art will appreciate that the teachings are applicable to networks operating according to other standards. Therefore, the scope of the claims is not limited by the specific examples enumerated herein, which are provided for the purpose of illustration.

Figure 1:
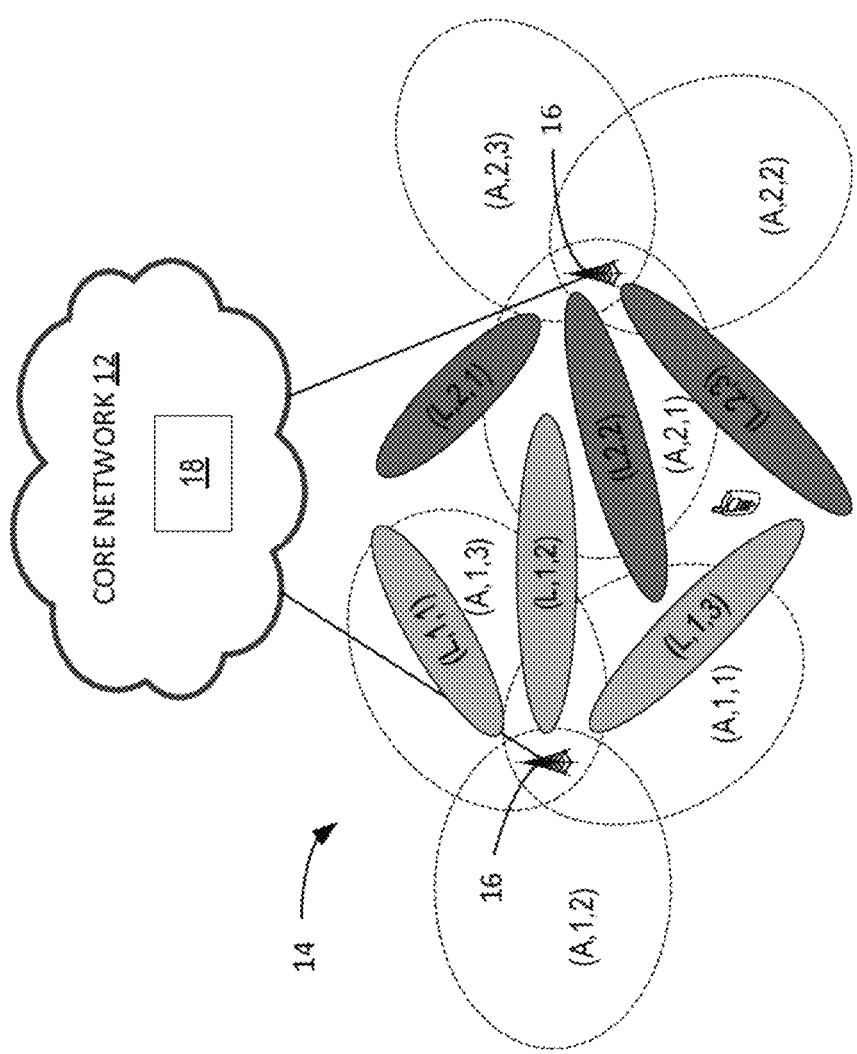
FIG. 1 illustrates an exemplary communication network using relatively wide access beams for cell acquisition and synchronization and relatively narrow link beams for data transmissions.

FIG. 1 illustrates an exemplary wireless communication network 10 for implementing the RL-based handover method as herein described. The wireless communication network 10 comprises a core network 12 and a radio access network (RAN) 14 including a plurality of base stations 16. Each base stations 16 transmits one or more access beams (shown in dotted lines) with relatively large beam-width for cell acquisition and synchronization, while relatively narrow link beams (shown with colored fill) are used for data transmissions. The beams are denoted by the notation (x, y, z) where x is the beam type (A or B), y corresponds to the base station 16 or cell, and z is the beam number. A centralized network node 18 in the core network represents a new component to support reinforcement learning (RL)-based handovers as herein described.

Figure 2:
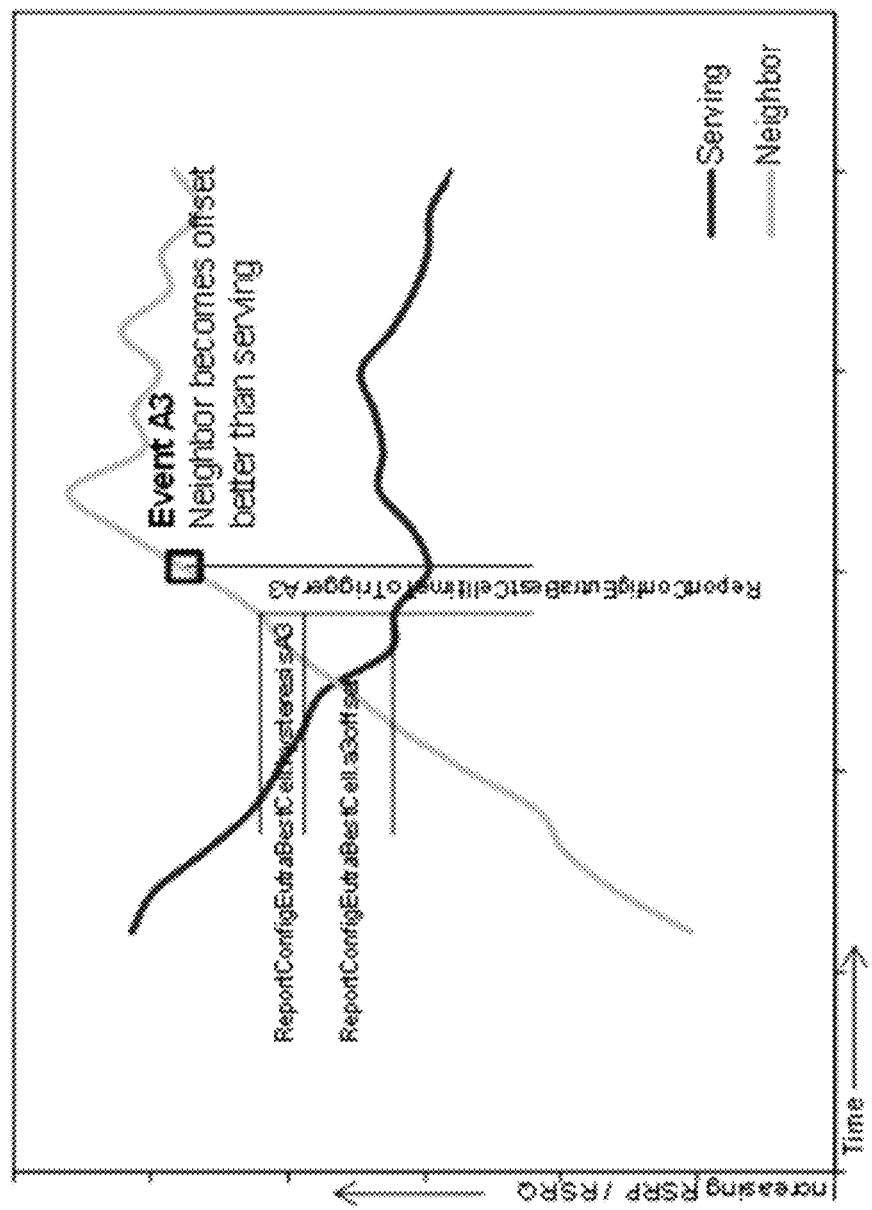
FIG. 2 is a graph of the signal from a serving cell and a neighboring cell as a UE moves away from the serving cell and towards the neighboring cell.

In conventional LTE networks, a UE 20 continuously monitors the signal strength of the serving cell and neighboring cells as it moves around in the coverage area of the network and reports the signal strength measurements to the serving base station 16. The signal strength measurements are typically made on downlink reference signals. As shown in FIG. 2, when a UE 20 is moving away from the serving cell and approaches the cell edge, the reference signal received power (RSRP) of the serving cell decreases and the RSRP of one or more neighboring cells increase. When the RSRP of the serving cell drops below an acceptable level and the RSRP of the neighboring cell RSRP exceeds the RSRP of the serving cell by a predetermined threshold (i.e., hysteresis-value), the serving base station 16 initiates a handover. Hysteresis is used to overcome the ping-pang effect in handovers. This approach has worked well in LTE networks and networks based on earlier standards.

Many new use cases envisaged in 5G require high capacity. Increased capacity can be accomplished in the 5G context in several ways. For example, increased capacity can be achieved by using massive MIMO in mmWave band to exploit the spatial dimensions, or by designing spectrally efficient physical layer waveforms, etc. However, the most common way to increase capacity is by network densification and therefore future 5G cellular system will be dense. This makes mobility a big challenge in 5G networks. Coupled with this higher density, 5G networks need to support different deployment options, lean transmission modes, advanced beam-forming capabilities, etc. All these make the 5G radio-frequency (RF) environment very rich.

With the evolution of Fifth Generation (5G) networks, the radio frequency (RE) environment of the cellular network 10 will change significantly rendering the conventional handover methods sub-optimal. For example, in certain deployments of 5G networks, the access beams carrying the reference signals used for signal measurements may have relatively large beam-width, while the link beams used for data transmission may have a narrow beam-width. Further, the link beams may extend for a greater distance from the center of the cell. In such scenarios, the measurements performed on reference signals carried by the access beams do not provide information about the strength of the link beams.

Figure 3:
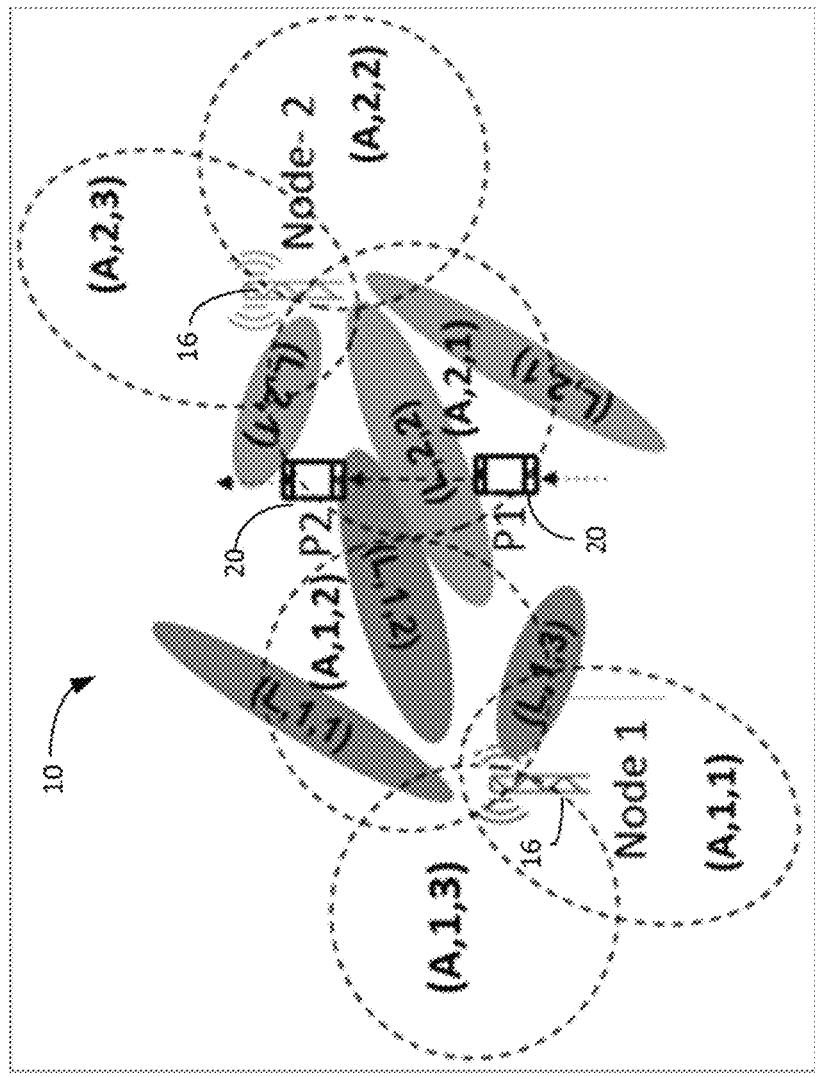
FIG. 3 illustrates an exemplary deployment in a typical 5G network with two base stations denoted as Node 1 and Node 2. Each base station is transmitting 2 access beams and 3 link beams.

FIG. 3 illustrates one scenario where the conventional handover methods provide sub-optimal results. FIG. 3 illustrates two base station 16 referred to as Node 1 and Node 2. The access beams transmitted by each base station 16 are shown in dotted lines. When the UE 20 is in position P1, the UE 20 is connected to the Node-2. At this position, the link beam power received from Node-2 (L,2,2) is the highest ensuring good throughput, and is the best choice. When the UE 20 moves to position P2, the RSRP of the access-beams from Node-1 and Node-2 are both high enough to perform initial access and cell acquisition. However, throughput performance would be better if a handover to Node-1 is performed since the link-beam (L,1,2) from Node-1 has a higher RSRP. Using the conventional handover methods, the handover decision is based on the access-beam power of the serving cell and neighboring cells so a handover will not be performed in this scenario even though a handover would result in better radio conditions and higher throughout for the UE 20.

To extract maximum performance from 5G networks, a new approach to handover is needed. Due to the distinct RF characteristics of 5G networks, selecting the target base station for a handover based on the measurements of references signals carried by the access beams may not be optimal. Also, in-order to exploit the rich RF environment, the handover method should take feedback about its action and learn from the choice of the actions. It is also important that the handover actions should not be biased by the short-term gain, instead be driven by long-term gains for the UE such as throughput, RLF etc.

All the above lends itself nicely into a reinforcement learning (RL) based framework for handover actions. According to one aspect of the disclosure, handovers between base-stations are controlled using a centralized RL-based machine learning (ML) agent. This agent handles the radio measurement reports from the UEs and chooses appropriate handover actions in accordance with the RL machine learning framework to maximize a long-term utility. Since the throughput is related to the link-beam RSRP we have used this to illustrate the utility of this invention.

Figure 4:
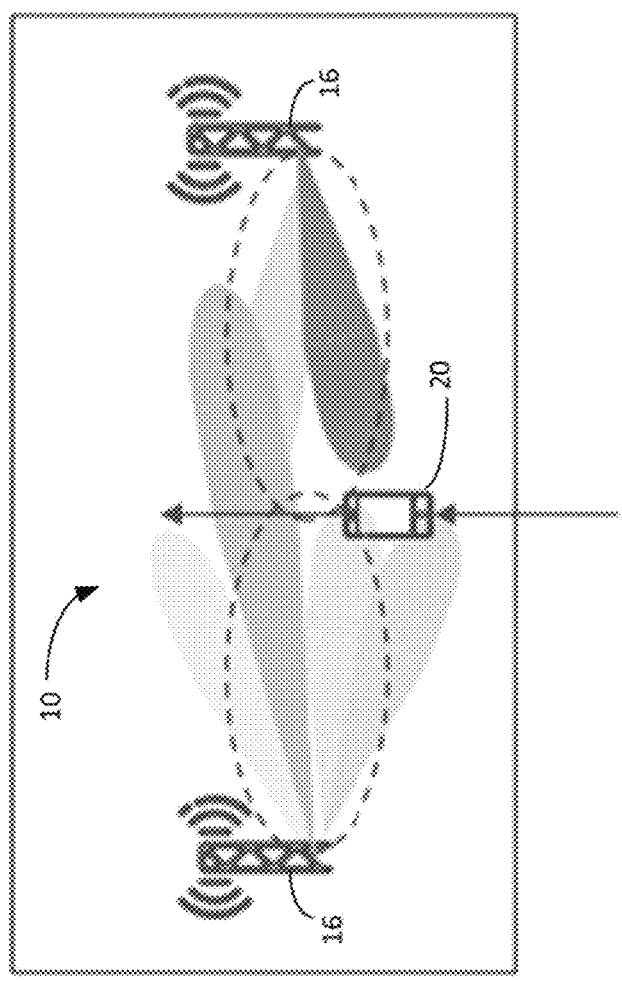
FIG. 4 illustrates an unknown radio environment with several access beams and link beams.

Imagine that a UE 20 is in an unknown radio environment having several link beams and access beams as shown in the FIG. 4. A centralized node (not shown) receives measurement data (percepts) from a plurality of UEs, based on which the centralized agent chooses a base station 16 as a target for a handover (action) to maximize a certain utility. In the following description, link beam RSRP is used as a measure of utility, although other measures of utility could also be used in place of or in addition to link beam RSRP. This centralized agent can be for a single base-station or for the group of base-stations.

Figure 5:
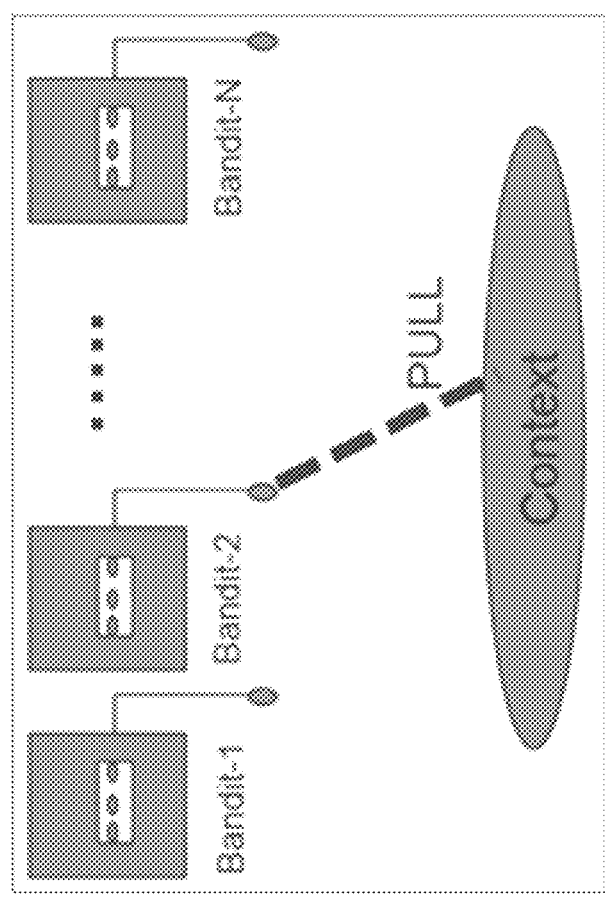
FIG. 5 illustrates the contextual multi-arm bandit problem.

In one example, the centralized agent residing on the centralized network node 18 applies RL-based learning to historical measurement data from a plurality of UEs to make the handover decision. Out of many possible RL frameworks, the mobility problem fits well into the multi-arm contextual bandit formulation. Referring to FIG. 5 the multi-arm bandit problem involves learning to play the arm in a set of N-bandits whose reward distribution is unknown, such that on an average the reward received is maximized. The contextual multi-arm bandit is an extension of the multi-arm bandit problem where the choice of the arm depends on the context as well.

In exemplary embodiments, the measurement reports received from the UEs provide information about the radio environment of the UE and can be used to derive the context of the UE. The action, i.e., pulling of the arm, is analogous to the choosing the target base-station for the handover. One can choose the arm in such a way that the average reward is maximized.

In one embodiment, the received powers from each of the access beams, link beams, or both, can be used as the context. In this formulation, the reward is the link-beam RSRP realized after the action is taken, i.e. after the handover. During the training phase, the RSRP of the selected link beam following a handover should therefore be reported to the centralized network node 18.

Figure 6:
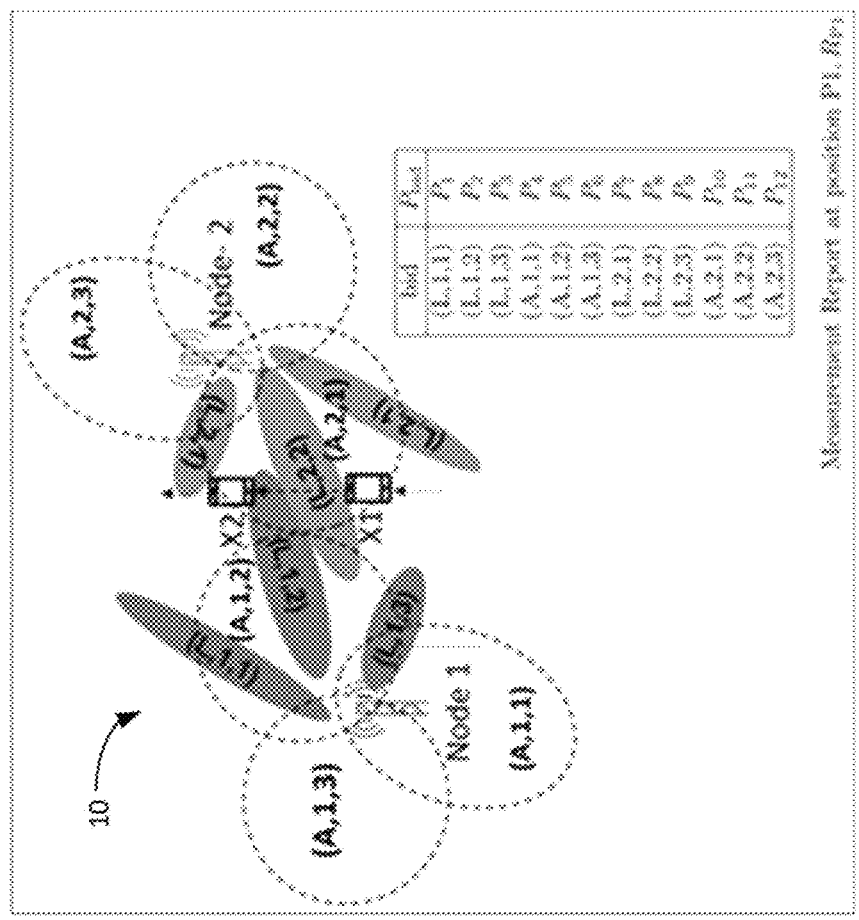
FIG. 6 illustrates measurement reporting for the network deployment shown in FIG. 4.

FIG. 6 illustrates an exemplary radio environment context for the UE 20, which is defined by the serving base station 16 and the beam powers from the access beams and link beams. Included in FIG. 6 is a measurement report provided by the UE 20 at position X1. Note that in FIG. 6, beam-id (bid) indicated by triplet (x,y,z) represents the type of beam (access (A)/Link (L)), associated node (e.g, Node 1 or Node 2), and beam number respectively. The beam number varies between 1 to N where N is the number of link/access beams available for that base station 16.

Many methodologies exist for implementing the proposed formulation of the handover decision as a contextual multi-arm bandit problem. One possible implementation is through Q-Learning based design. In this example, the Q-Learning agent learns by trying all actions in all states (contexts) repeatedly during a training phase to learn what actions are the best. With this approach, the state-action-values are typically stored in a Q-table structure as shown in Table 1.

TABLE 1

Q-Table Example

| <RSRP from beams, Serving-cell> | Target Cell (action) | Value (reward) |
|---|---|---|
| <$P_1 \ldots P_N$, 1> | $C_i$ | $R_1$ |
| <$P_1 \ldots P_N$, 1> | $C_j$ | $R_2$ |
| . . . . . | . | . |
| | . | . |
| | . | . |
| . . . , . | . | . |
| | . | . |
| | . | . |

In the example shown in Table 1, the beam-powers together with serving cell defines the "context/state", the selection of the target cell for the handover corresponds to the "action", and the RSRP of the link beam after the handover forms "value/reward". Each row represent the results of one handover event. During the training phase the Q-table is built and during the active phase the constructed Q-table provides a mapping for choosing those actions (e.g., target base station) that yields largest value/rewards.

Referring again to the example shown in FIG. 6, when the UE 20 moves from position X1 to X2, a handover may be initiated to Node 1 even though the RSRP of the access beam for Node-2 is higher than that of Node-1 because the value/reward for the corresponding action of choosing Node-1 in the Q-Table is higher than the value from remaining connected to Node-2. The value is derived from the link-beam RSRP and the link beam RSRP corresponding to the Node-1 (refer to (L,1,2)) is high. Thus, the value for choosing Node 1 in this example is higher than the value of choosing Node 2 even though the RSRP of the access beam for Node 2 is higher.

Although the example uses RSRP as the value, those skilled in the art will appreciate that the he reward/value configuration can be based on other factors in addition to or in place of link beam performance. Further, the handover decision may also be based on the ability to perform initial access and synchronization to ensure that a UE 20 is not dropped when making the handover. Dropped calls can be avoided by making sure that the base station 16s considered for handover targets have sufficient access beam power for initial access and synchronization.

In the formulation of the handover problem described above, the state-space is continuous so it is not possible to store all possible states/contexts in the Q-table. In one embodiment, the Q-table provides a coarse representation of the state-space, which is constructed during the training phase. During the active phase, the current context of the UE 20 is derived from the measurement reports sent by the UE 20 and a similarity function is used to map the current context of the UE 20 to the closest radio environment context in the Q-table. The mapping from current context to stored radio environment contexts can be based on the minimum Euclidean distance between current context of the UE 20 and the radio environment context in the Q-table. The selection of the radio environment context from the Q-table is give by:

$$c = \min_{c \in Q} \|c - p'\| \quad \text{Eq. (10)}$$

where p' denotes the context constructed from the measurement report having beam measurements and the serving cell during the active phase. The c denotes the context in the Q-table (Q) with minimum Euclidean distance to p'. The choice during the active phase of the base station 16 to be the handover target is given by Eq. 2 below:

$$C = \max_t (V_Q(c, C_t)) \quad \text{Eq. (2)}$$

where $V_Q(c, C_i)$ denotes the "value/reward" for choosing the cell $C_i$ for the context c in the Q table.

Performance Evaluation

Figure 7:
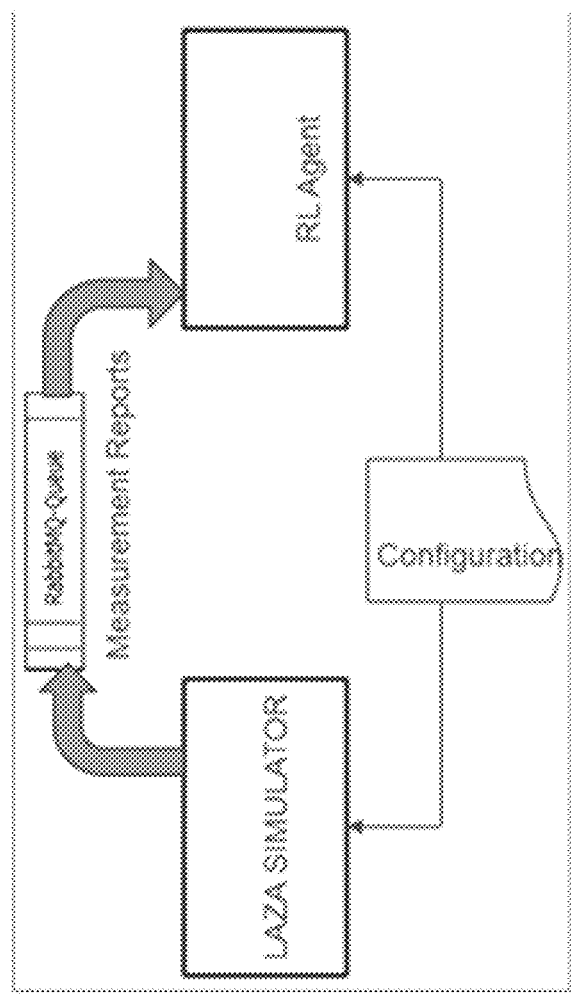
FIG. 7 illustrates a Laza simulator used for evaluating the performance of the RL-based handover methods.

Simulations were performed to compare the RL-based handover approach as herein described with the conventional handover method for three distinct RF environments. Enviroment-1 and Environment-2 are based on a Laza simulator. A Laza simulator is a lean simulator which provides easy configurations of beams, mobility and deployment through a simple configuration file. The Laza simulator feeds real-time measurement data into a queue from which an RL agent can perform real-time analytics on the measurement data as shown in FIG. 7.

Figure 8:
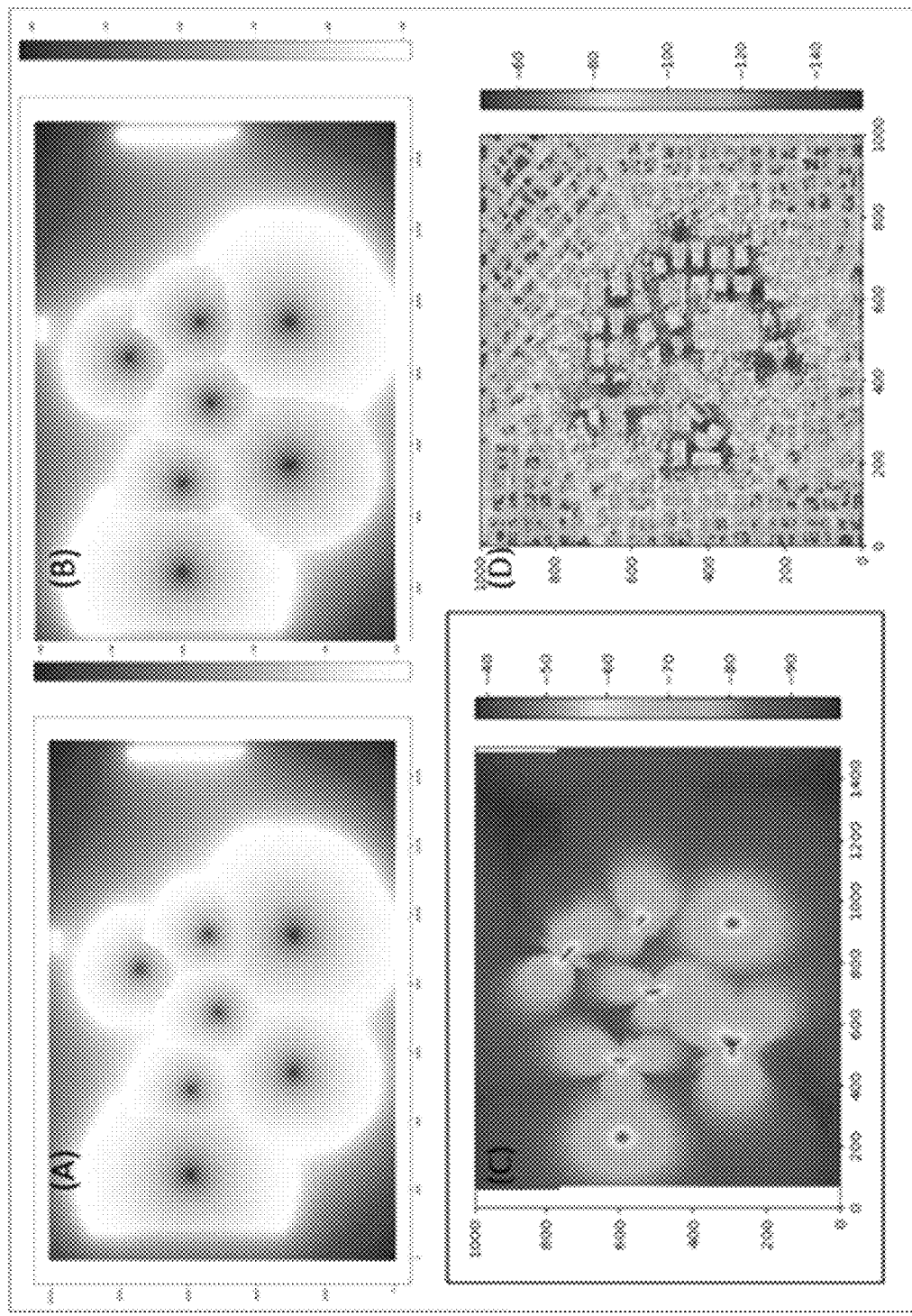
FIG. 8 illustrates the RF environment for different environment settings used in the performance evaluation. (A) shows the access-beam setup. (B) and (C) show link-beam energy distributions for environment-1 and environment-2. (D) shows the link-beam setup for the environment-3.

Environment-3 is based on the International Telecommunication Union (ITU) defined statistical model described in "Guidelines for evaluation of radio interface technologies for IMT-Advanced," Technical report, ITU-R M.2135-1 ITU, 2009. The statistical propagation model used is defined as "Asian-City" with 7 roof-top sites with 21 base station 16s each having 1 access beam and 8 link beams. The configurations for the environments is shown in Table 2 and the RF beam patterns for the environments are shown in FIG. 8.

TABLE 2

Similutaiton Environments

| Environment-1 | |
|---|---|
| Field size | 1 km × 1.5 km |
| No of base-stations | 7 |
| No of access beams | [3 3 3 3 3 3 3] |
| No of link beams | [3 10 10 10 10 10 3] |
| Transmit Power (dB) | [43 40 40 45 40 40 43] |
| Mobility Model | Semi-deterministic |

| Environment-2 | |
|---|---|
| Field size | 1 km × 1.5 km |
| No of base-stations | 7 |
| No of access beams | [3 3 3 3 3 3 3] |
| No of link beams | [3 3 3 3 3 3 3] |
| Transmit Power (dB) | [43 40 40 45 40 40 43] |
| Mobility Model | Semi-deterministic |

| Environment-3 | |
|---|---|
| Field size | 1 km × 1 km |
| No of base-stations | 21 |
| No of access beams | [1 1 . . . 1] |
| No of link beams | [8 8 . . . 8] |
| Mobility Model | Semi-deterministic |

In all the three environments, a semi-deterministic mobility was assumed where UE 20 takes steps in a vertical direction and relocates randomly to a different X-position when UE 20 hits the edge of the raster/field. At each step the measurement is sent to the RL agent and a decision on the handover is made. Performance was evaluated after 10,000 steps using the following:

Average link-beam RSRP, $E[P_i]$,

Probability density function (PDF) of the received link-beam RSRP, $p(P_i)$

Figure 9:
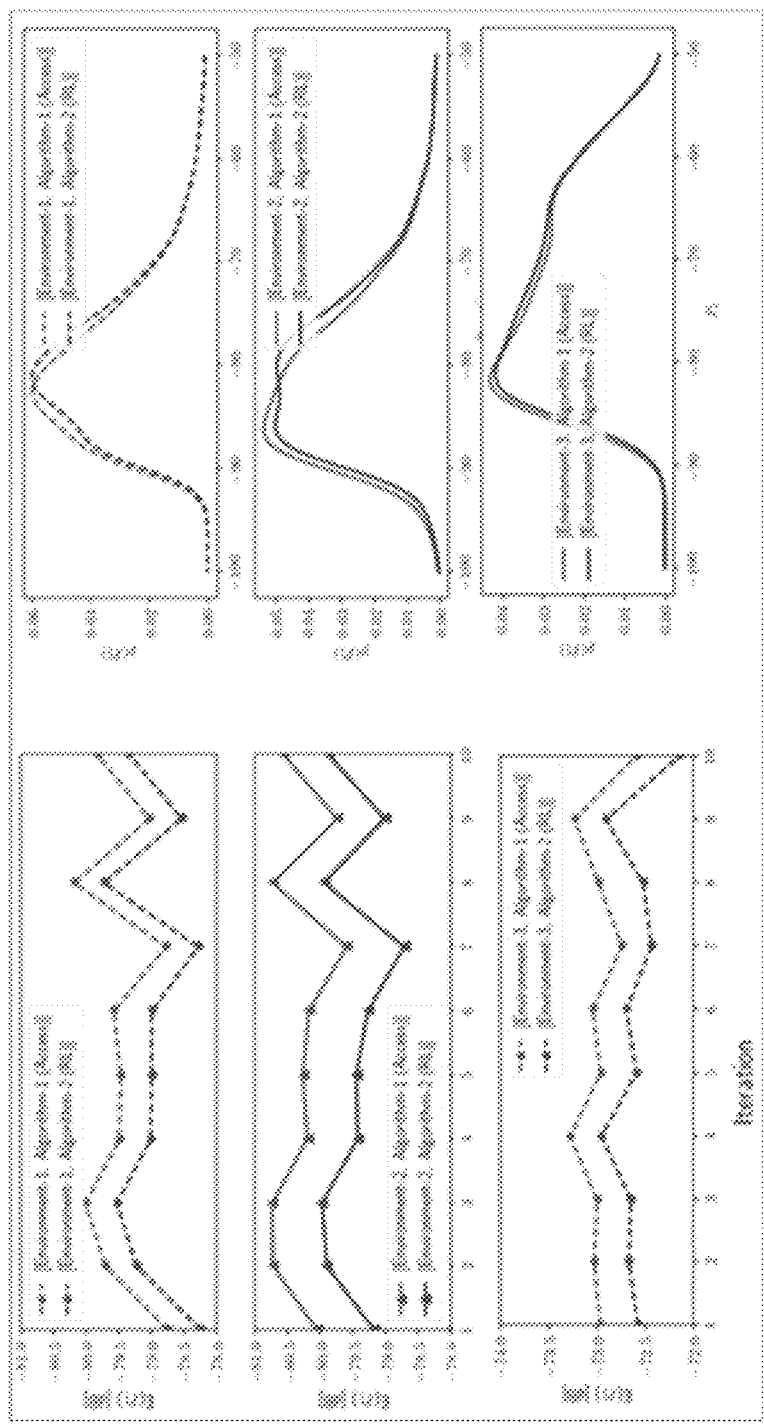
FIG. 9 comprises graphs comparing the performance of the RL-based handover approach to conventional handover methods.

Graphs comparing the average link-beam gain, $E[P_i]$, and PDF of the received link-beam RSRP for the RL-based handover method as herein described with the conventional handover method in all three environments are shown in FIG. 9. Each iteration includes the results for 10000 steps with different seeds. The simulations show that the gain in the Environment-2 is more than in Environment-1, which is due to higher opportunity for the RL based mechanism to select the better base-station as the link-beams in this environment are narrow and penetrate deep in to the neighbor cells. Also, the results for Enviromnent-3 shows that the gain of about 0.5 dB for the standard defined propagation models can be obtained.

Figure 10:
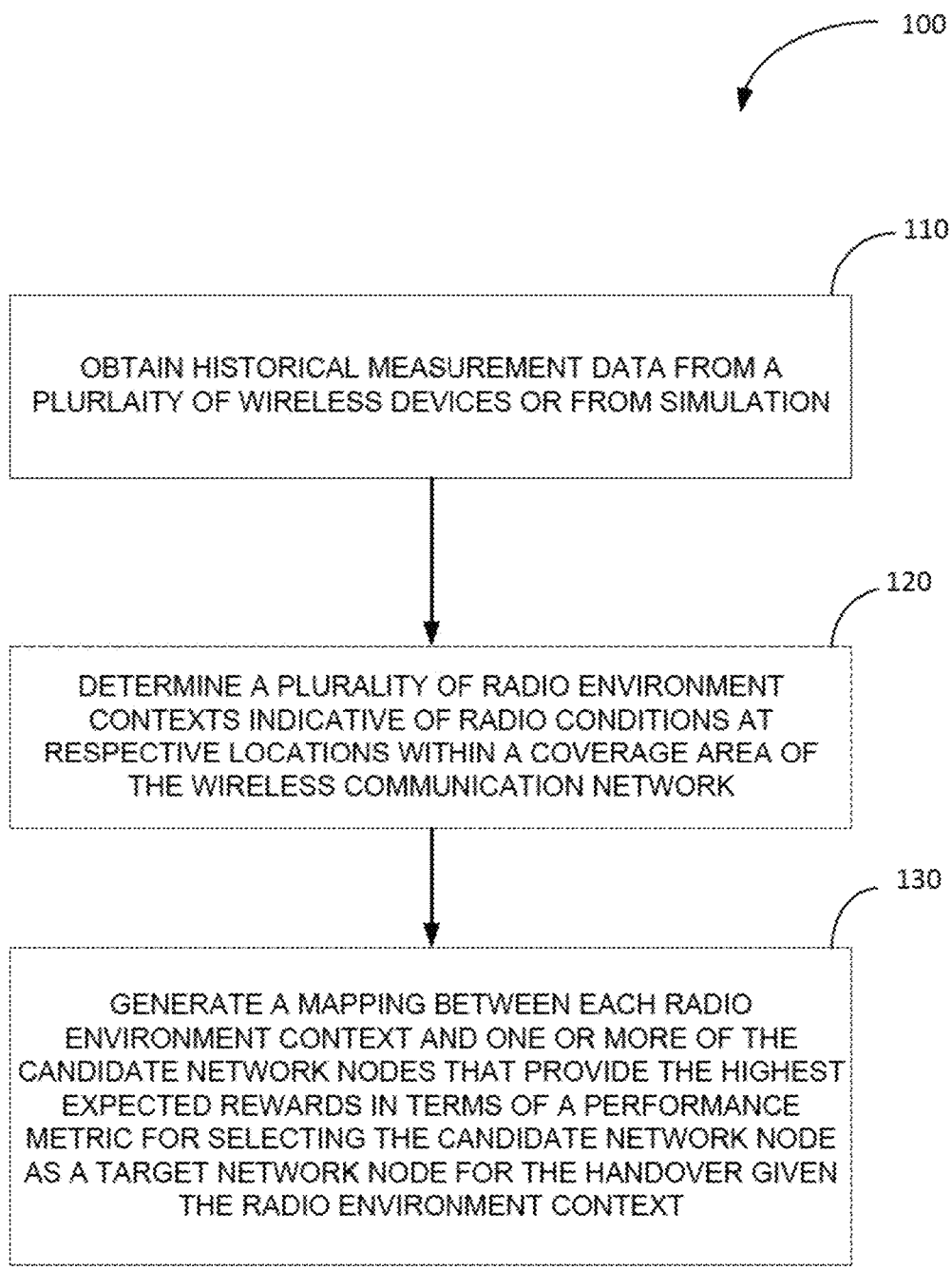
FIG. 10 illustrates a method implemented during a training by a network node.

FIG. 10 illustrates an exemplary method 100 implemented by a network node, such as the centralize network node 18, of applying machine learning to support handovers in a wireless communication network 10. The method 100 is used during a training phase to generate a mapping between radio environment contexts and target base stations 16 for a handover. The network node optionally obtains historical measurement data from a plurality of UEs, or from simulations of a communication network (block 110). Based on the historical measurement data, the network node, determines a plurality of radio environment contexts indicative of radio conditions at respective locations within a coverage area of the wireless communication network (block 120). The network node further generates a mapping between each radio environment context and one or more of the candidate network nodes that provide the highest expected rewards in terms of a performance metric for selecting the candidate network node as a target network node for the handover given the radio environment context (block 120).

During the active phase, the mapping generated by the network node as described above can be applied to the selection of a target base station 16 for a handover. In some embodiments, the handover determination may be made by the base stations 16 based on mappings generated by the centralized network node 18. In other embodiments, the handover determination may be made by the centralized network node 18 or other network node in the core network 12.

Figure 11:
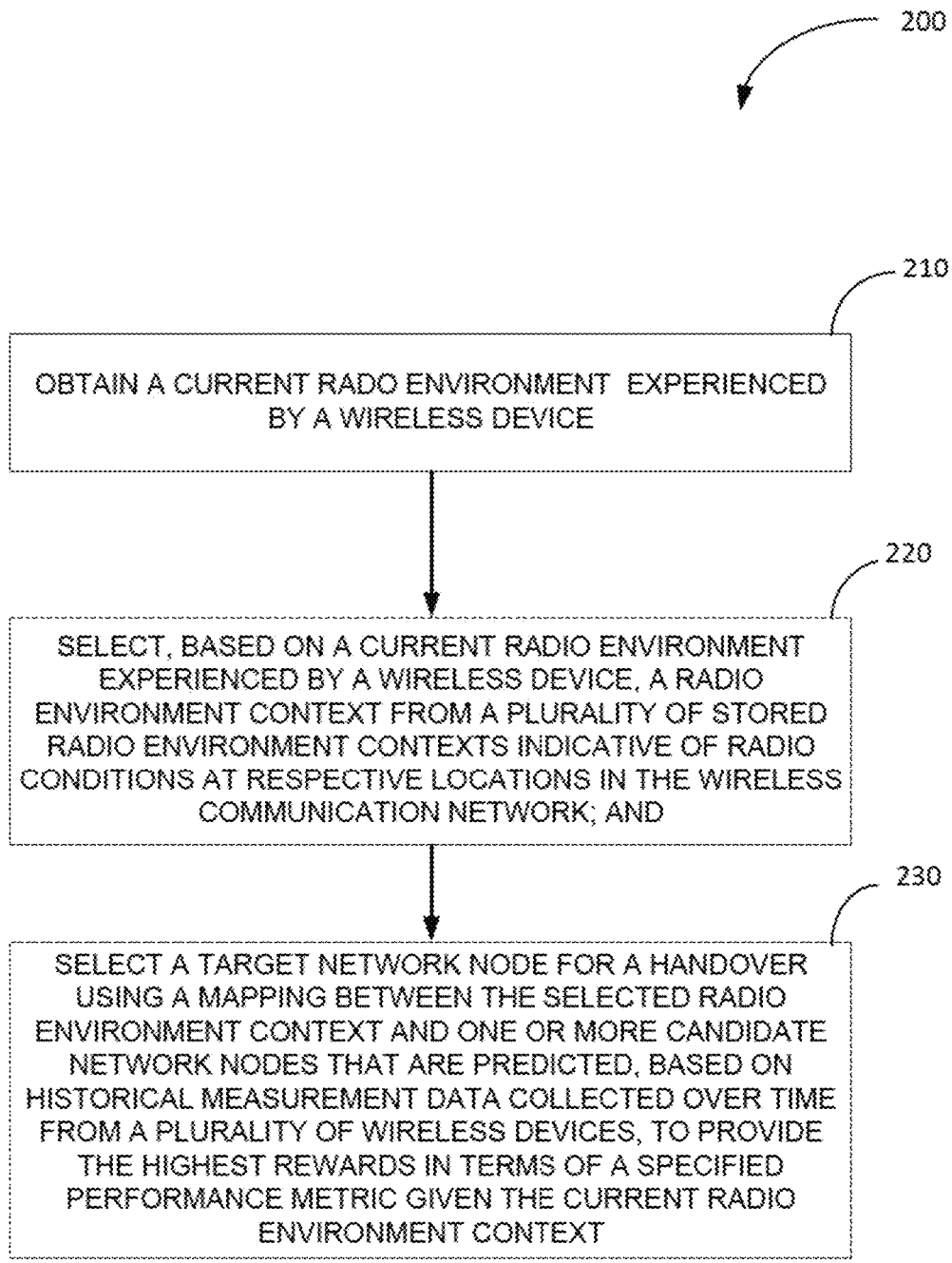
FIG. 11 illustrates a method implemented by a network node during an active phase.

FIG. 11 illustrates a handover method 200 implemented by a base station 16 or other network node in a wireless communication network. The method 200 is used during the active phase to select a target base station 16 for a handover based on the mapping between radio environment contexts and target base stations 16 for a handover. The base station 16 or other network node may optionally obtain a current radio environment for a UE 20 based on a measurement report. (block 210) The base station 16 or other network node selects, based on a current radio environment experienced by a wireless device, a radio environment context from a plurality of stored radio environment contexts indicative of radio conditions at respective locations in the wireless communication network (block 220). This selection may be based on a similarity function as previously described. After determining the closest radio environment context, the base station 16 or other network node selects a target network node for a handover using a mapping between the selected radio environment context and one or more candidate network nodes that are predicted, based on historical measurement data collected over time from a plurality of wireless devices, to provide the highest rewards in terms of a specified performance metric given the current radio environment context (block 230).

Apparatuses configured to perform the methods as herein described can be implemented by any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 12:
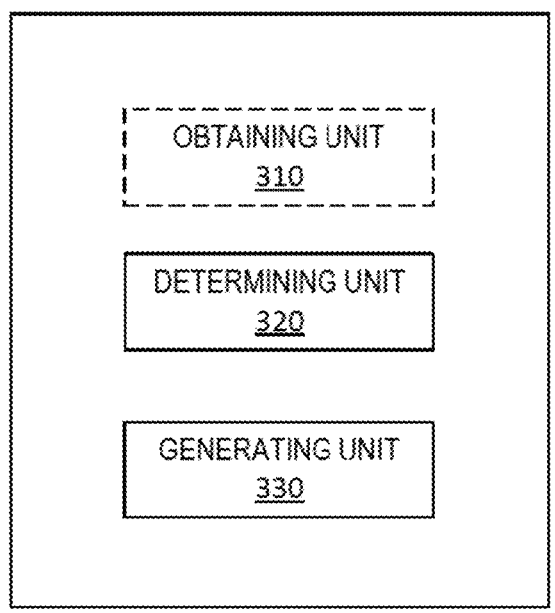
FIG. 12 illustrates a network node configured to generate a mapping between radio environment contexts and handover targets.

FIG. 12 illustrates a network node 300 configured to perform the method 100 of FIG. 10. The network node 300 comprises an obtaining unit 310, a determining unit 320 and a generating unit 330. The units 310-330 can be implemented by hardware and/or by software code that is executed by one or more processors or processing circuits. The obtaining unit 310 is configured to obtain historical measurement data from a plurality of UEs, or from simulations of a communication network. The determining unit 320 is configured to determine a plurality of radio environment contexts indicative of radio conditions at respective locations within a coverage area of the wireless communication network. The generating unit 330 is configured to generate a mapping between each radio environment context and one or more of the candidate network nodes that provide the highest expected rewards in terms of a performance metric for selecting the candidate network node as a target network node for the handover given the radio environment context.

Figure 13:
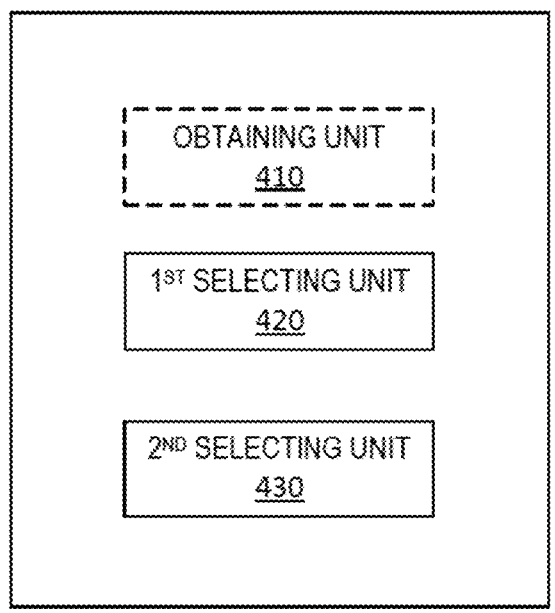
FIG. 13 illustrates a network node configured to use the mapping between radio environment contexts and handover targets to determine a handover target

FIG. 13 illustrates a network node 400 configured to perform the method 200 of FIG. 11. The network node 300 comprises an obtaining unit 410, a first selecting unit 420 and a second selecting unit 430. The units 410-430 can be implemented by hardware and/or by software code that is executed by one or more processors or processing circuits. The obtaining unit 410 is configured to obtain a current radio environment for a UE 20 based on a measurement report. The first selecting unit 420 is configured to select, based on a current radio environment experienced by a wireless device, a radio environment context from a plurality of stored radio environment contexts indicative of radio conditions at respective locations in the wireless communication network. The second selecting unit 430 is configured to select a target network node for a handover using a mapping between the selected radio environment context and one or more candidate network nodes that are predicted, based on historical measurement data collected over time from a plurality of wireless devices, to provide the highest rewards in terms of a specified performance metric given the current radio environment context.

Figure 14:
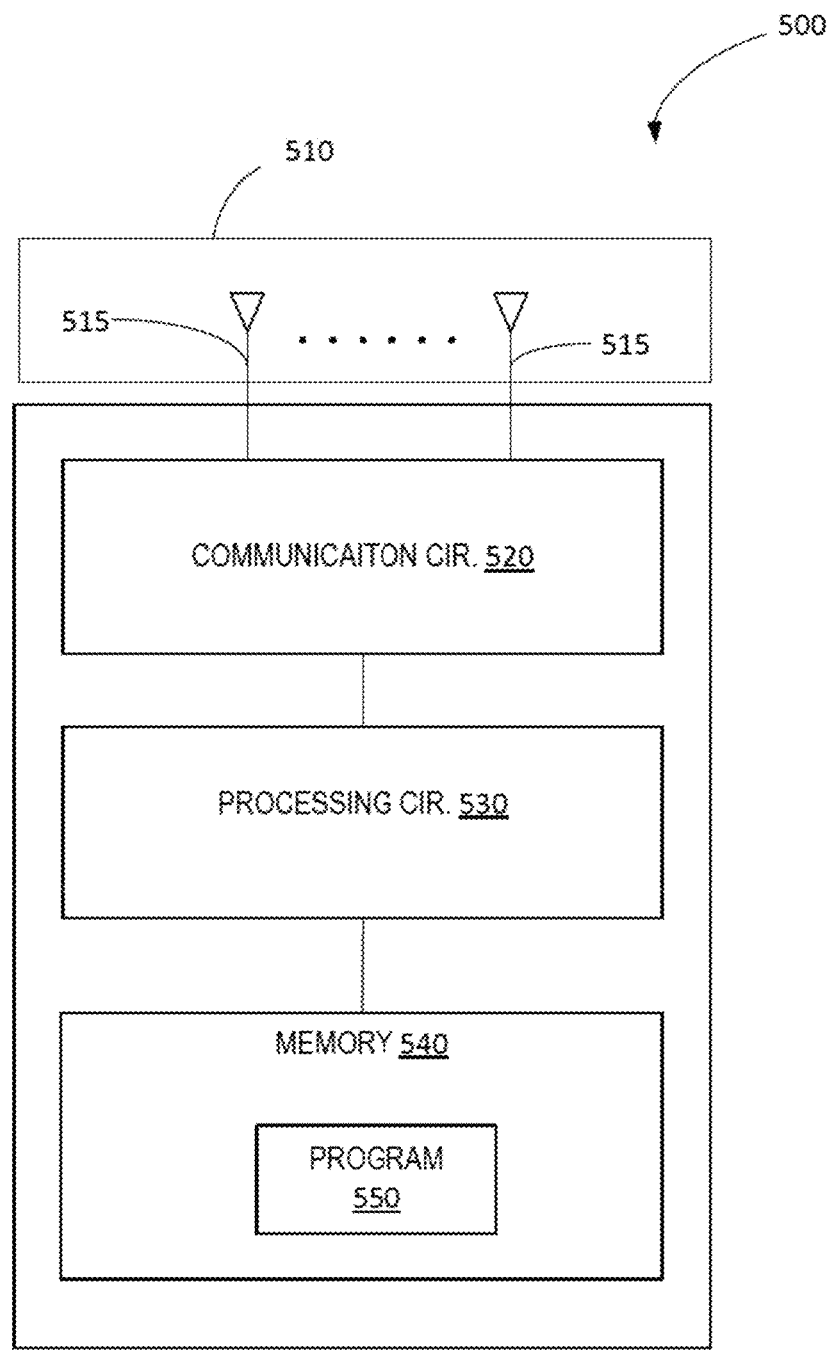
FIG. 14 illustrates a network node configured to implement RL-based handovers as herein described.

FIG. 14 illustrates a network node 500 according to another embodiment that is configured to implement the methods as herein described. The network node 500 comprises a communication circuit 520, a processing circuit 530, and memory 540.

The communication circuit 520 enables communication with other network nodes over wired or wireless networks. In some embodiments, where the network node 500 serves as a base station 16, the communication circuit 520 further comprises the radio frequency (RF) circuitry needed for transmitting and receiving signals over a wireless communication channel.

The processing circuit 530 controls the overall operation of the network node 500 and can be configured to perform one or both of the methods 100 and 200 shown in FIGS. 10 and 11 respectively. The processing circuit 530 may comprise one or more microprocessors, hardware, firmware, or a combination thereof.

Memory 540 comprises both volatile and non-volatile memory for storing computer program code and data needed by the processing circuit 530 for operation. Memory 540 may comprise any tangible, non-transitory computer-readable storage medium for storing data including electronic, magnetic, optical, electromagnetic, or semiconductor data storage. Memory 540 stores a computer program 550 comprising executable instructions that configure the processing circuit 530 to implement one or more of the methods 100 and 200 according to FIGS. 10 and 11 respectively. described herein. In general, computer program instructions and configuration information are stored in a non-volatile memory, such as a ROM, erasable programmable read only memory (EPROM) or flash memory. Temporary data generated during operation may be stored in a volatile memory, such as a random access memory (RAM). In some embodiments, computer program 550 for configuring the processing circuit 530 as herein described may be stored in a removable memory, such as a portable compact disc, portable digital video disc, or other removable media. The computer program 550 may also be embodied in a carrier such as an electronic signal, optical signal, radio signal, or computer readable storage medium.

The RL-based handover techniques herein provide a method to derive inference for handover action based on a strategy that enhances the long-term performance objectives by predicting the future performance metric for chosen handover actions compared to the current state of the art methods where handover action is based on the instantaneous or past few measurement reports. Rule-based handover strategy as suggested in 3GPP specifications can be altered into automatically configured setup using offline-training.

The RL formulation using contextual multi-arm bandit for handover mechanism uses an innovative reward configuration for the contextual multi-arm bandit for handover mechanism. Further, a novel approach is described to design context for the contextual multi-arm bandit problem using measurements and serving cell. Since the measurement space is continuous, an innovative approach to avoid state explosion by intelligent similarity function design (refer to equation 1 and equation 2) is provided.

The strategy of self-optimizing the handover action through active learning as described by the RL formulation will enhance the performance in future 5G systems. With appropriate reward configuration and offline training in the described method one can achieve the mobility robustness optimization as specified in the 3GPP specification without radio-link reporting to network management system Additional Embodiments Although the subject matter described herein may be implemented in any appropriate type of system using any suitable components, the embodiments disclosed herein are described in relation to a wireless network, such as the example wireless network illustrated in FIG. 15. For simplicity, the wireless network of FIG. 15 only depicts network 1106, network nodes 1160 and 1160*b*, and WDs 1110, 1110*b*, and 1110*c*. In practice, a wireless network may further include any additional elements suitable to support communication between wireless devices or between a wireless device and another communication device, such as a landline telephone, a service provider, or any other network node or end device. Of the illustrated components, network node 1160 and wireless device (WD) 1110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM) Universal Mobile Telecommunications System (UMTS), Long Term Evolution (LTE), Narrowband Internet of Things (NB-IoT), and/or other suitable 2G, 3G, 4G, or 5G standards: wireless local area network (WLAN) standards, such as the IEEE 802.11 standards: and/or any other appropriate wireless communication standard, such as the Worldwide Interoperability for Microwave Access (WiMax), Bluetooth, Z-Wave and/or ZigBee standards.

Network 1106 may comprise one or more backhaul networks, core networks, IP networks, public switched telephone networks (PSTNs), packet data networks, optical networks, wide-area networks (WANs), local area networks (LANs), wireless local area networks OA/LANs), wired networks, wireless networks, metropolitan area networks, and other networks to enable communication between devices.

Network node 1160 and WD 1110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pica base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

Figure 15:
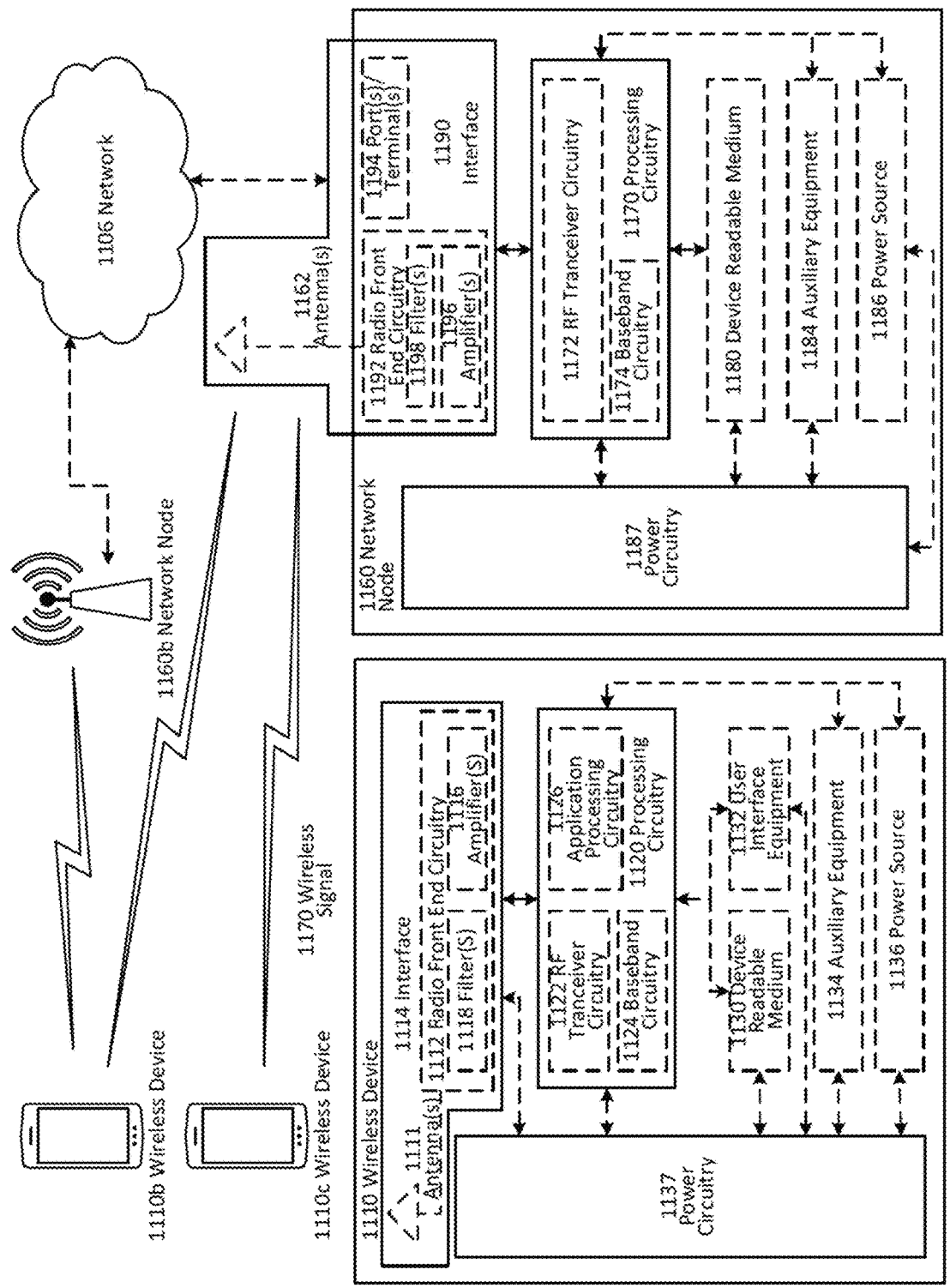
FIG. 15 illustrates an exemplary wireless network according to an embodiment.

In FIG. 15, network node 1160 includes processing circuitry 1170, device readable medium 1180, interface 1190, auxiliary equipment 1184, power source 1186, power circuitry 1187, and antenna 1162. Although network node 1160 illustrated in the example wireless network of FIG. 15 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1160 are depicted as single boxes located within a larger box, or nested within multiple boxes, in practice, a network node may comprise multiple different physical components that make up a single illustrated component (e.g., device readable medium 1180 may comprise multiple separate hard drives as well as multiple RAM modules).

Similarly, network node 1160 may be composed of multiple physically separate components (e.g., a NodeB component and a RNC component, or a BTS component and a BSC component, etc.), which may each have their own respective components. In certain scenarios in which network node 1160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1160 may be configured to support multiple radio access technologies (RATs). In such embodiments, some components may be duplicated (e.g., separate device readable medium 1180 for the different RATs) and some components may be reused (e.g., the same antenna 1162 may be shared by the RATs). Network node 1160 may also include multiple sets of the various illustrated components for different wireless technologies integrated into network node 1160, such as, for example, GSM, WCDMA, LTE, NR, WiFi, or Bluetooth wireless technologies. These wireless technologies may be integrated into the same or different chip or set of chips and other components within network node 1160.

Processing circuitry 1170 is configured to perform any determining, calculating, or similar operations (e.g., certain obtaining operations) described herein as being provided by a network node. These operations performed by processing circuitry 1170 may include processing information obtained by processing circuitry 1170 by, for example, converting the obtained information into other information, comparing the obtained information or converted information to information stored in the network node, and/or performing one or more operations based on the obtained information or converted information, and as a result of said processing making a determination.

Processing circuitry 1170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1160 components, such as device readable medium 1180, network node 1160 functionality. For example, processing circuitry 1170 may execute instructions stored in device readable medium 1180 or in memory within processing circuitry 1170. Such functionality may include providing any of the various wireless features, functions, or benefits discussed herein. In some embodiments, processing circuitry 1170 may include a system on a chip (SOC).

In some embodiments, processing circuitry 1170 may include one or more of radio frequency (RE) transceiver circuitry 1172 and baseband processing circuitry 1174. In some embodiments, radio frequency (RE) transceiver circuitry 1172 and baseband processing circuitry 1174 may be on separate chips (or sets of chips), boards, or units, such as radio units and digital units. In alternative embodiments, part or all of RF transceiver circuitry 1172 and baseband processing circuitry 1174 may be on the same chip or set of chips, boards, or units In certain embodiments, some or all of the functionality described herein as being provided by a network node, base station, eNB or other such network device may be performed by processing circuitry 1170 executing instructions stored on device readable medium 1180 or memory within processing circuitry 1170. In alternative embodiments, some or all of the functionality may be provided by processing circuitry 1170 without executing instructions stored on a separate or discrete device readable medium, such as in a hard-wired manner. In any of those embodiments, whether executing instructions stored on a device readable storage medium or not, processing circuitry 1170 can be configured to perform the described functionality. The benefits provided by such functionality are not limited to processing circuitry 1170 alone or to other components of network node 1160, but are enjoyed by network node 1160 as a whole, and/or by end users and the wireless network generally.

Device readable medium 1180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1170. Device readable medium 1180 may store any suitable instructions, data or information, including a computer program, software, an application including one or more of logic, rules, code, tables, etc. and/or other instructions capable of being executed by processing circuitry 1170 and, utilized by network node 1160. Device readable medium 1180 may be used to store any calculations made by processing circuitry 1170 and/or any data received via interface 1190. In some embodiments, processing circuitry 1170 and device readable medium 1180 may be considered to be integrated.

Interface 1190 is used in the wired or wireless communication of signaling and/or data between network node 1160, network 1106, and/or WDs 1110. As illustrated, interface 1190 comprises port(s)/terminal(s) 1194 to send and receive data, for example to and from network 1106 over a wired connection. Interface 1190 also includes radio front end circuitry 1192 that may be coupled to, or in certain embodiments a part of, antenna 1162. Radio front end circuitry 1192 comprises filters 1198 and amplifiers 1196. Radio front end circuitry 1192 may be connected to antenna 1162 and processing circuitry 1170. Radio front end circuitry may be configured to condition signals communicated between antenna 1162 and processing circuitry 1170. Radio front end circuitry 1192 may receive digital data that is to be sent out to other network nodes or WDs via a wireless connection. Radio front end circuitry 1192 may convert the digital data into a radio signal having the appropriate channel and bandwidth parameters using a combination of filters 1198 and/or amplifiers 1196. The radio signal may then be transmitted via antenna 1162. Similarly, when receiving data, antenna 1162 may collect radio signals which are then converted into digital data by radio front end circuitry 1192. The digital data may be passed to processing circuitry 1170. In other embodiments, the interface may comprise different components and/or different combinations of components.

In certain alternative embodiments, network node 1160 may not include separate radio front end circuitry 1192, instead, processing circuitry 1170 may comprise radio front end circuitry and may be connected to antenna 1162 without separate radio front end circuitry 1192. Similarly, in some embodiments, all or some of RF transceiver circuitry 1172 may be considered a part of interface 1190. In still other embodiments, interface 1190 may include one or more ports or terminals 1194, radio front end circuitry 1192, and RE transceiver circuitry 1172, as part of a radio unit (not shown), and interface 1190 may communicate with baseband processing circuitry 1174, which is part of a digital unit (not shown).

Antenna 1162 may include one or more antennas, or antenna arrays, configured to send and/or receive wireless signals. Antenna 1162 may be coupled to radio front end circuitry 1190 and may be any type of antenna capable of transmitting and receiving data and/or signals wirelessly. In some embodiments, antenna 1162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1162 may be separate from network node 1160 and may be connectable to network node 1160 through an interface or port.

Antenna 1162, interface 1190, and/or processing circuitry 1170 may be configured to perform any receiving operations and/or certain obtaining operations described herein as being performed by a network node. Any information, data and/or signals may be received from a wireless device, another network node and/or any other network equipment. Similarly, antenna 1162, interface 1190, and/or processing circuitry 1170 may be configured to perform any transmitting operations described herein as being performed by a network node. Any information, data and/or signals may be transmitted to a wireless device, another network node and/or any other network equipment.

Power circuitry 1187 may comprise, or be coupled to, power management circuitry and is configured to supply the components of network node 1160 with power for performing the functionality described herein. Power circuitry 1187 may receive power from power source 1186. Power source 1186 and/or power circuitry 1187 may be configured to provide power to the various components of network node 1160 in a form suitable for the respective components (e.g., at a voltage and current level needed for each respective component). Power source 1186 may either be included in, or external to, power circuitry 1187 and/or network node 1160. For example, network node 1160 may be connectable to an external power source (e.g., an electricity outlet) via an input circuitry or interface such as an electrical cable, whereby the external power source supplies power to power circuitry 1187. As a further example, power source 1186 may comprise a source of power in the form of a battery or battery pack which is connected to, or integrated in, power circuitry 1187. The battery may provide backup power should the external power source fail. Other types of power sources, such as photovoltaic devices, may also be used.

Alternative embodiments of network node 1160 may include additional components beyond those shown in FIG. 15 that may be responsible for providing certain aspects of the network node's functionality, including any of the functionality described herein and/or any functionality necessary to support the subject matter described herein. For example, network node 1160 may include user interface equipment to allow input of information into network node 1160 and to allow output of information from network node 1160. This may allow a user to perform diagnostic, maintenance, repair, and other administrative functions for network node 1160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (FDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred, to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1110 includes antenna 1111, interface 1114, processing circuitry 1120, device readable medium 1130, user interface equipment 1132, auxiliary equipment 1134, power source 1136 and power circuitry 1137. WD 1110 may include multiple sets of one or more of the illustrated components for different wireless technologies supported by WD 1110, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD 1110.

Antenna 1111 may include one or more antennas or antenna arrays, configured to send and/or receive wireless signals, and is connected to interface 1114. In certain alternative embodiments, antenna 1111 may be separate from WD 1110 and be connectable to WD 1110 through an interface or port. Antenna 1111, interface 1114, and/or processing circuitry 1120 may be configured to perform any receiving or transmitting operations described herein as being performed by a WD. Any information, data and/or signals may be received from a network node and/or another WD. In some embodiments, radio front end circuitry and/or antenna 1111 may be considered an interface.

As illustrated, interface 1114 comprises radio front end circuitry 1112 and antenna 1111. Radio front end circuitry 1112 comprise one or more filters 1118 and amplifiers 1116. Radio front end circuitry 1114 is connected to antenna 1111 and processing circuitry 1120, and is configured to condition signals communicated between antenna 1111 and processing circuitry 1120. Radio front end circuitry 1112 may be coupled to or a part of antenna 1111. In some embodiments, WD 1110 may not include separate radio front end circuitry 1112; rather, processing circuitry 1120 may comprise radio front end circuitry and may be connected to antenna 1111. Similarly, in some embodiments, some or all of RF transceiver circuitry 1122 may be considered a part of interface 1114. Radio front end circuitry 1112 may receive digital data that is to be sent out to other network nodes or WDs via a wireless connection. Radio front end circuitry 1112 may convert the digital data into a radio signal having the appropriate channel and bandwidth parameters using a combination of filters 1118 and/or amplifiers 1116. The radio signal may then be transmitted via antenna 1111. Similarly, when receiving data, antenna 1111 may collect radio signals which are then converted into digital data by radio front end circuitry 1112. The digital data may be passed to processing circuitry 1120. In other embodiments, the interface may comprise different components and/or different combinations of components.

Processing circuitry 1120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1110 components, such as device readable medium 1130, WD 1110 functionality. Such functionality may include providing any of the various wireless features or benefits discussed herein. For example, processing circuitry 1120 may execute instructions stored in device readable medium 1130 or in memory within processing circuitry 1120 to provide the functionality disclosed herein.

As illustrated, processing circuitry 1120 includes one or more of RF transceiver circuitry 1122, baseband processing circuitry 1124, and application processing circuitry 1126. In other embodiments, the processing circuitry may comprise different components and/or different combinations of components. In certain embodiments processing circuitry 1120 of WD 1110 may comprise a SOC. In some embodiments, RF transceiver circuitry 1122, baseband processing circuitry 1124, and application processing circuitry 1126 may be on separate chips or sets of chips. In alternative embodiments, part or all of baseband processing circuitry 1124 and application processing circuitry 1126 may be combined into one chip or set of chips, and RF transceiver circuitry 1122 may be on a separate chip or set of chips. In still alternative embodiments, part or all of RF transceiver circuitry 1122 and baseband processing circuitry 1124 may be on the same chip or set of chips, and application processing circuitry 1126 may be on a separate chip or set of chips. In yet other alternative embodiments, part or all of RF transceiver circuitry 1122, baseband processing circuitry 1124, and application processing circuitry 1126 may be combined in the same chip or set of chips. In some embodiments, RF transceiver circuitry 1122 may be a part of interface 1114. RF transceiver circuitry 1122 may condition RF signals for processing circuitry 1120.

In certain embodiments, some or all of the functionality described herein as being performed by a WD may be provided by processing circuitry 1120 executing instructions stored on device readable medium 1130, which in certain embodiments may be a computer-readable storage medium. In alternative embodiments, some or all of the functionality may be provided by processing circuitry 1120 without executing instructions stored on a separate or discrete device readable storage medium, such as in a hard-wired manner. In any of those particular embodiments, whether executing instructions stored on a device readable storage medium or not, processing circuitry 1120 can be configured to perform the described functionality. The benefits provided by such functionality are not limited to processing circuitry 1120 alone or to other components of WD 1110, but are enjoyed by WD 1110 as a whole, and/or by end users and the wireless network generally.

Processing circuitry 1120 may be configured to perform any determining, calculating, or similar operations (e.g., certain obtaining operations) described herein as being performed by a WD. These operations, as performed by processing circuitry 1120, may include processing information obtained by processing circuitry 1120 by, for example, converting the obtained information into other information, comparing the obtained information or converted information to information stored by WD 1110, and/or performing one or more operations based on the obtained information or converted information, and as a result of said processing making a determination.

Device readable medium 1130 may be operable to store a computer program, software, an application including one or more of logic, rules, code, tables, etc. and/or other instructions capable of being executed by processing circuitry 1120. Device readable medium 1130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1120. In some embodiments, processing circuitry 1120 and device readable medium 1130 may be considered to be integrated.

User interface equipment 1132 may provide components that allow for a human user to interact with WD 1110. Such interaction may be of many forms, such as visual, audial, tactile, etc. User interface equipment 1132 may be operable to produce output to the user and to allow the user to provide input to WD 1110. The type of interaction may vary depending on the type of user interface equipment 1132 installed in WD 1110. For example, if WD 1110 is a smart phone, the interaction may be via a touch screen; if WD 1110 is a smart meter, the interaction may be through a screen that provides usage (e.g., the number of gallons used) or a speaker that provides an audible alert (e.g., if smoke is detected). User interface equipment 1132 may include input interfaces, devices and circuits, and output interfaces, devices and circuits. User interface equipment 1132 is configured to allow input of information into WD 1110, and is connected to processing circuitry 1120 to allow processing circuitry 1120 to process the input information. User interface equipment 1132 may include, for example, a microphone, a proximity or other sensor, keys/buttons, a touch display, one or more cameras, a USB port, or other input circuitry. User interface equipment 1132 is also configured to allow output of information from WD 1110, and to allow processing circuitry 1120 to output information from WD 1110. User interface equipment 1132 may include, for example, a speaker, a display, vibrating circuitry, a USB port, a headphone interface, or other output circuitry. Using one or more input and output interfaces, devices, and circuits, of user interface equipment 1132, WD 1110 may communicate with end users and/or the wireless network, and allow them to benefit from the functionality described herein.

Auxiliary equipment 1134 is operable to provide more specific functionality which may not be generally performed by WDs. This may comprise specialized sensors for doing measurements for various purposes, interfaces for additional types of communication such as wired communications etc. The inclusion and type of components of auxiliary equipment 1134 may vary depending on the embodiment and/or scenario.

Power source 1136 may, in some embodiments, be in the form of a battery or battery pack. Other types of power sources, such as an external power source (e.g., an electricity outlet), photovoltaic devices or power cells, may also be used. WD 1110 may further comprise power circuitry 1137 for delivering power from power source 1136 to the various parts of WD 1110 which need power from power source 1136 to carry out any functionality described or indicated herein. Power circuitry 1137 may in certain embodiments comprise power management circuitry. Power circuitry 1137 may additionally or alternatively be operable to receive power from an external power source: in which case WD 1110 may be connectable to the external power source (such as an electricity outlet) via input circuitry or an interface such as an electrical power cable. Power circuitry 1137 may also in certain embodiments be operable to deliver power from an external power source to power source 1136. This may be, for example, for the charging of power source 1136. Power circuitry 1137 may perform any formatting, converting, or other modification to the power from power source 1136 to make the power suitable for the respective components of WO 1110 to which power is supplied.

Figure 16:
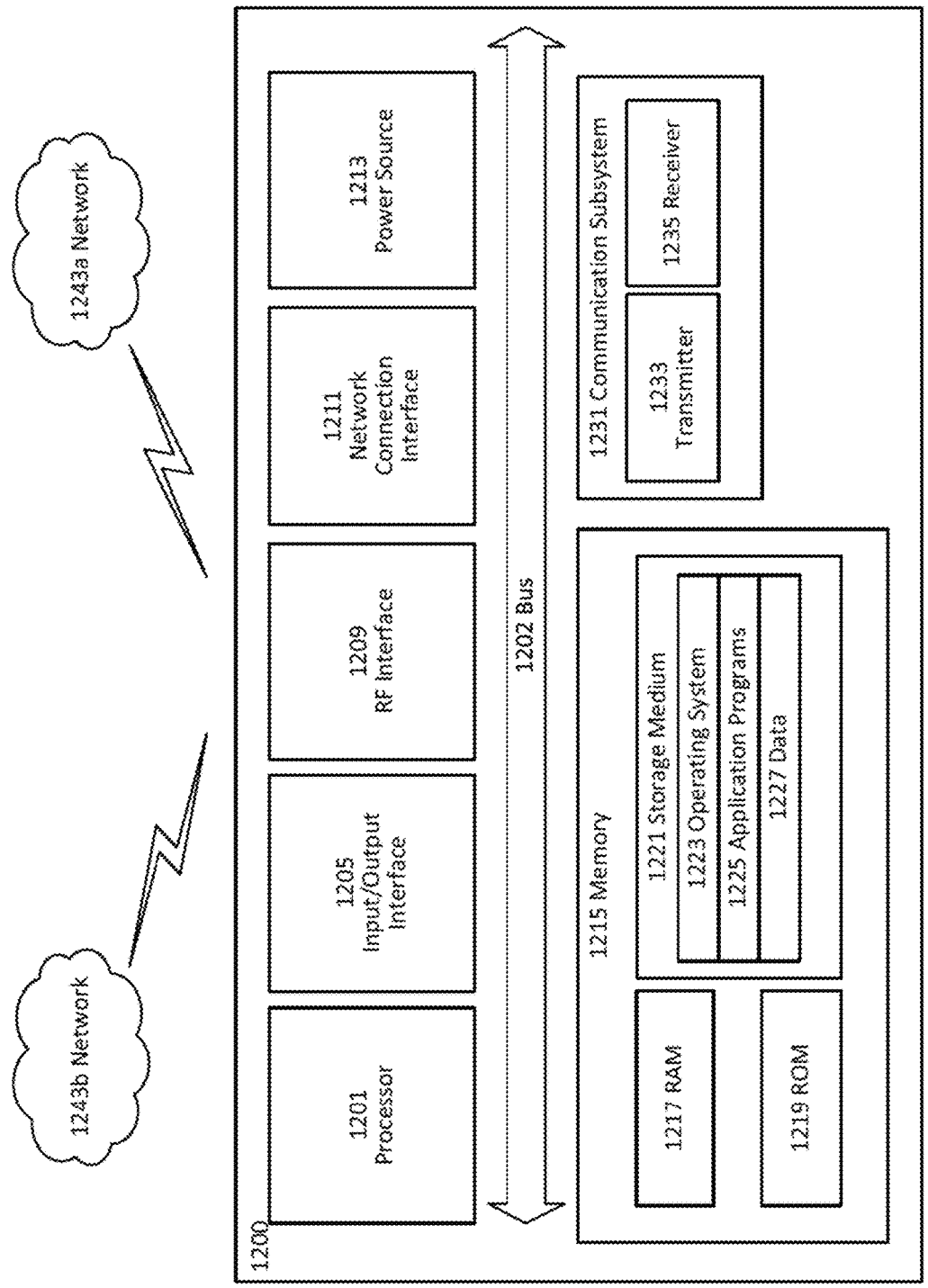
FIG. 16 illustrates an exemplary UE according to an embodiment.

FIG. 16 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 12200 may be any UE identified by the 3rd Generation Partnership Project (3GPP), including a NB-IoT UE, a machine type communication (MTC) UE, and/or an enhanced MTC (eMTC) UE. UE 1200, as illustrated in FIG. 16, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 16 is a UE, the components discussed herein are equally applicable to a WD, and vice-versa.

In FIG. 16, UE 1200 includes processing circuitry 1201 that is operatively coupled to input/output interface 1205, radio frequency (RF) interface 1209, network connection interface 1211, memory 1215 including random access memory (RAM) 1217, read-only memory (ROM) 1219, and storage medium 1221 or the like, communication subsystem 1231, power source 1233, and/or any other component, or any combination thereof. Storage medium 1221 includes operating system 1223, application program 1225, and data 1227. In other embodiments, storage medium 1221 may include other similar types of information. Certain UEs may utilize all of the components shown in FIG. 16, or only a subset of the components. The level of integration between the components may vary from one UE to another UE. Further, certain UEs may contain multiple instances of a component, such as multiple processors, memories, transceivers, transmitters, receivers, etc.

In FIG. 16, processing circuitry 1201 may be configured to process computer instructions and data. Processing circuitry 1201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1201 may include two central processing units (CPUs). Data may be information in a form suitable for use by a computer.

In the depicted embodiment, input/output interface 1205 may be configured to provide a communication interface to an input device, output device, or input and output device. UE 1200 may be configured to use an output device via input/output interface 1205. An output device may use the same type of interface port as an input device. For example, a USB port may be used to provide input to and, output from UE 1200. The output device may be a speaker, a sound card, a video card, a display, a monitor, a printer, an actuator, an emitter, a smartcard, another output device, or any combination thereof. UE 1200 may be configured to use an input device via input/output interface 1205 to allow a user to capture information into UE 1200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 16, RF interface 1209 may be configured to provide a communication interface to RF components such as a transmitter, a receiver, and an antenna. Network connection interface 1211 may be configured to provide a communication interface to network 1243a. Network 1243a may encompass wired and/or wireless networks such as a local-area network (LAN), a wide-area network (WAN), a computer network, a wireless network, a telecommunications network, another like network or any combination thereof. For example, network 1243a may comprise a Wi-Fi network. Network connection interface 1211 may be configured to include a receiver and a transmitter interface used to communicate with one or more other devices over a communication network according to one or more communication protocols, such as Ethernet, TCP/IP, SONET, ATM, or the like. Network connection interface 1211 may implement receiver and transmitter functionality appropriate to the communication network links (e.g., optical, electrical, and the like). The transmitter and receiver functions may share circuit components, software or firmware, or alternatively may be implemented separately.

RAM 1217 may be configured to interface via bus 1202 to processing circuitry 1201 to provide storage or caching of data or computer instructions during the execution of software programs such as the operating system, application programs, and device drivers. ROM 1219 may be configured to provide computer instructions or data to processing circuitry 1201. For example, ROM 1219 may be configured to store invariant low-level system code or data for basic system functions such as basic input and output (I/O), startup, or reception of keystrokes from a keyboard that are stored, in a non-volatile memory. Storage medium 1221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1221 may be configured to include operating system 1223, application program 1225 such as a web browser application, a widget or gadget engine or another application, and data file 1227. Storage medium 1221 may store, for use by UE 1200, any of a variety of various operating systems or combinations of operating systems.

Storage medium 1221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1221 may allow UE 1200 to access computer-executable instructions, application programs or the like, stored on transitory or non-transitory memory media, to off-load data, or to upload data. An article of manufacture, such as one utilizing a communication system may be tangibly embodied in storage medium 1221, which may comprise a device readable medium.

In FIG. 16, processing circuitry 1201 may be configured to communicate with network 1243b using communication subsystem 1231. Network 1243a and network 1243b may be the same network or networks or different network or networks. Communication subsystem 1231 may be configured to include one or more transceivers used to communicate with network 1243b. For example, communication subsystem 1231 may be configured to include one or more transceivers used to communicate with one or more remote transceivers of another device capable of wireless communication such as another WD, UE, or base station of a radio access network (RAN) according to one or more communication protocols, such as IEEE 802.12, CDMA, WCDMA, GSM, LTE, UTRAN, WiMax, or the like. Each transceiver may include transmitter 1233 and/or receiver 1235 to implement transmitter or receiver functionality, respectively, appropriate to the RAN links (e.g., frequency allocations and the like). Further, transmitter 1233 and receiver 1235 of each transceiver may share circuit components, software or firmware, or alternatively may be implemented separately.

In the illustrated embodiment, the communication functions of communication subsystem 1231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1231 may include cellular communication, Wi-Fi communication, Bluetooth communication, and GPS communication. Network 1243b may encompass wired and/or wireless networks such as a local-area network (LAN), a wide-area network (WAN), a computer network, a wireless network, a telecommunications network, another like network or any combination thereof. For example, network 1243b may be a cellular network, a Wi-Fi network, and/or a near-field network. Power source 1213 may be configured to provide alternating current (AC) or direct current (DC) power to components of UE 1200.

The features, benefits and/or functions described herein may be implemented in one of the components of UE 1200 or partitioned across multiple components of UE 1200. Further, the features, benefits, and/or functions described herein may be implemented in any combination of hardware, software or firmware. In one example, communication subsystem 1231 may be configured to include any of the components described herein. Further, processing circuitry 1201 may be configured to communicate with any of such components over bus 1202. In another example, any of such components may be represented by program instructions stored in memory that when executed by processing circuitry 1201 perform the corresponding functions described herein. In another example, the functionality of any of such components may be partitioned between processing circuitry 1201 and communication subsystem 1231. In another example, the non-computationally intensive functions of any of such components may be implemented in software or firmware and the computationally intensive functions may be implemented in hardware.

Figure 17:
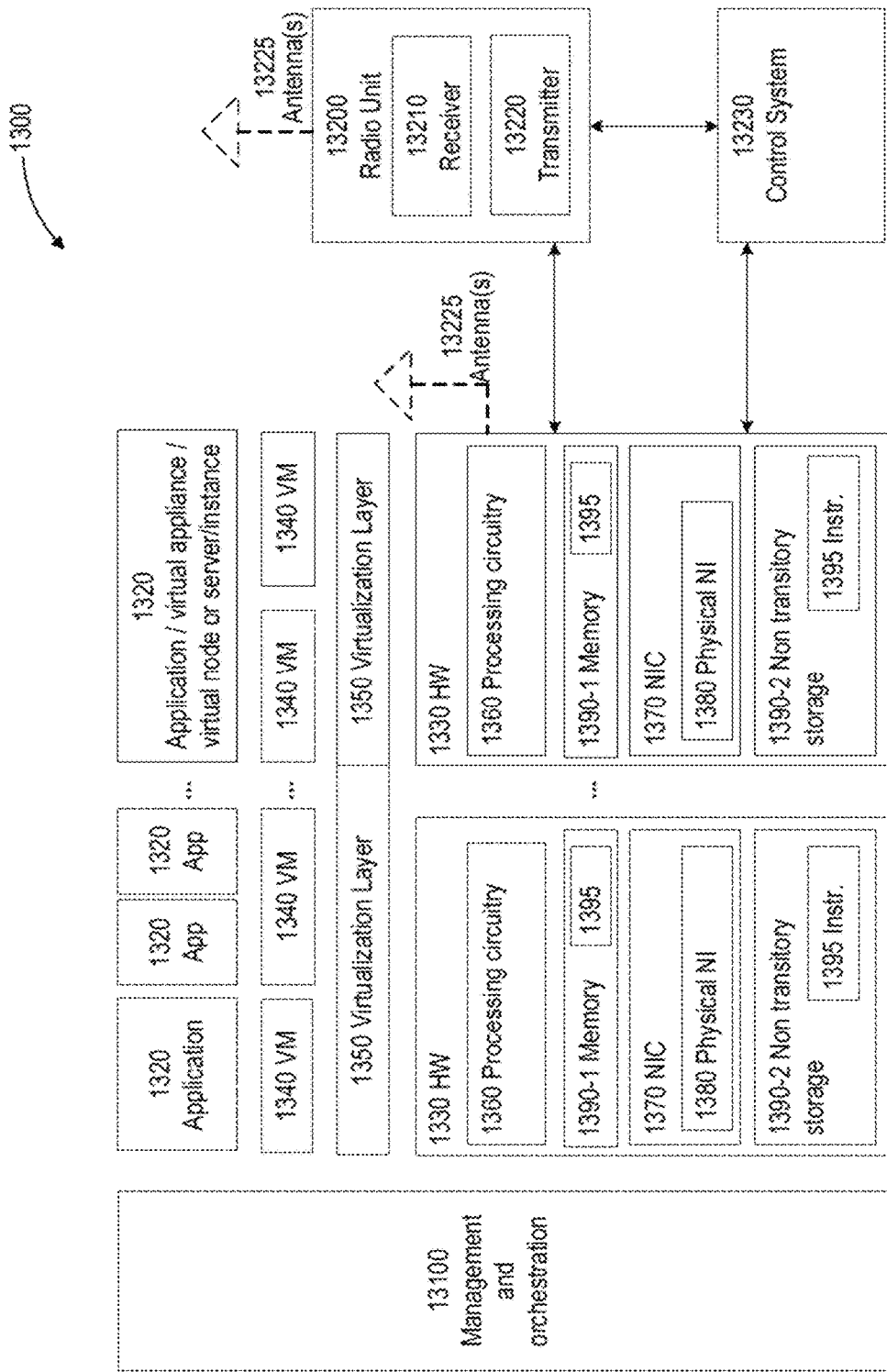
FIG. 17 illustrates an exemplary virtualization environment according to an embodiment.

FIG. 17 is a schematic block diagram illustrating a virtualization environment 1300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1300 hosted by one or more of hardware nodes 1330. Further, in embodiments in which the virtual node is not a radio access node or does not require radio connectivity (e.g., a core network node), then the network node may be entirely virtualized.

The functions may be implemented by one or more applications 1320 (which may alternatively be called software instances, virtual appliances, network functions, virtual nodes, virtual network functions, etc.) operative to implement some of the features, functions, and/or benefits of some of the embodiments disclosed herein. Applications 1320 are run in virtualization environment 1300 which provides hardware 1330 comprising processing circuitry 1360 and memory 1390. Memory 1390 contains instructions 1395 executable by processing circuitry 1360 whereby application 1320 is operative to provide one or more of the features, benefits, and/or functions disclosed herein.

Virtualization environment 1300, comprises general-purpose or special-purpose network hardware devices 1330 comprising a set of one or more processors or processing circuitry 1360, which may be commercial off-the-shelf (COTS) processors, dedicated Application Specific Integrated Circuits (ASICs), or any other type of processing circuitry including digital or analog hardware components or special purpose processors. Each hardware device may comprise memory 1390-1 which may be non-persistent memory for temporarily storing instructions 1395 or software executed by processing circuitry 1360. Each hardware device may comprise one or more network interface controllers (NICs) 1370, also known as network interface cards, which include physical network interface 1380. Each hardware device may also include non-transitory, persistent, machine-readable storage media 1390-2 having stored therein software 1395 and/or instructions executable by processing circuitry 1360. Software 1395 may include any type of software including software for instantiating one or more virtualization layers 1350 (also referred to as hypervisors), software to execute virtual machines 1340 as well as software allowing it to execute functions, features and/or benefits described in relation with some embodiments described herein.

Virtual machines 1340, comprise virtual processing, virtual memory, virtual networking or interface and virtual storage, and may be run by a corresponding virtualization layer 1350 or hypervisor. Different embodiments of the instance of virtual appliance 1320 may be implemented on one or more of virtual machines 1340, and the implementations may be made in different ways.

During operation, processing circuitry 1360 executes software 1395 to instantiate the hypervisor or virtualization layer 1350, which may sometimes be referred to as a virtual machine monitor (VMM). Virtualization layer 1350 may present a virtual operating platform that appears like networking hardware to virtual machine 1340.

As shown in FIG. 17, hardware 1330 may be a standalone network node with generic or specific components. Hardware 1330 may comprise antenna 13225 and may implement some functions via virtualization. Alternatively, hardware 1330 may be part of a larger cluster of hardware (e.g., such as in a data center or customer premise equipment (CPE)) where many hardware nodes work together and are managed via management and orchestration (MANO) 13100, which, among others, oversees lifecycle management of applications 1320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1340 may be a software implementation of a physical machine that runs programs as if they were executing on a physical, non-virtualized machine. Each of virtual machines 1340, and that part of hardware 1330 that executes that virtual machine, be it hardware dedicated to that virtual machine and/or hardware shared by that virtual machine with others of the virtual machines 1340, forms a separate virtual network elements (VNE).

Still in the context of NFV, Virtual Network Function (VNF) is responsible for handling specific network functions that run in one or more virtual machines 1340 on top of hardware networking infrastructure 1330 and corresponds to application 1320 in FIG. 17.

In some embodiments, one or more radio units 13200 that each include one or more transmitters 13220 and one or more receivers 13210 may be coupled to one or more antennas 13225. Radio units 13200 may communicate directly with hardware nodes 1330 via one or more appropriate network interfaces and may be used in combination with the virtual components to provide a virtual node with radio capabilities, such as a radio access node or a base station.

In some embodiments, some signaling can be effected with the use of control system 13230 which may alternatively be used for communication between the hardware nodes 1330 and radio units 13200.

Figure 18:
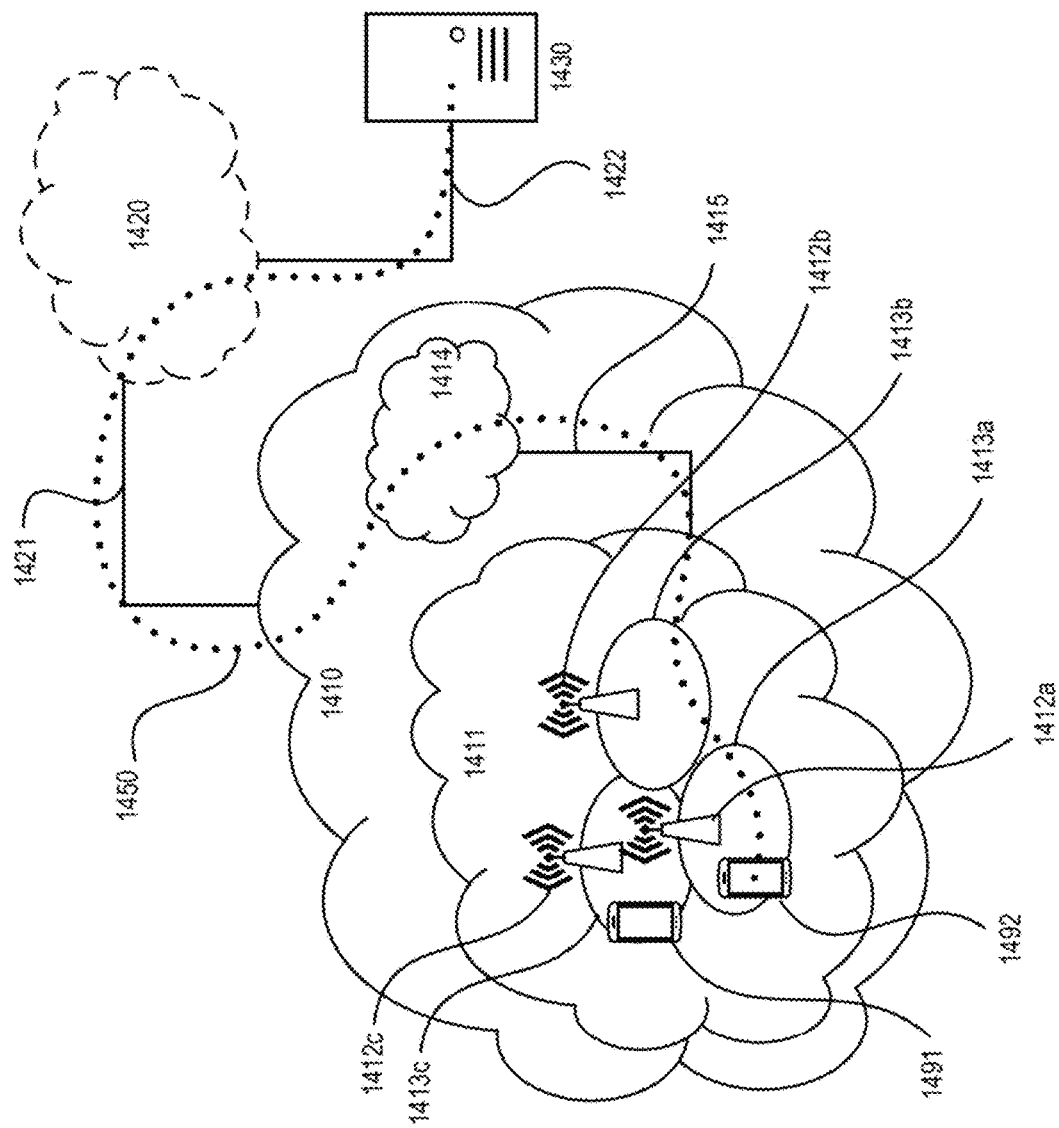
FIG. 18 illustrates an exemplary telecommunication network connected via an intermediate network to a host computer according to an embodiment.

FIG. 18 illustrates a telecommunication network connected via an intermediate network to a host computer in accordance with some embodiments. In particular, with reference to FIG. 18, in accordance with an embodiment, a communication system includes telecommunication network 1410, such as a 3GPP-type cellular network, which comprises access network 1411, such as a radio access network, and core network 1414. Access network 1411 comprises a plurality of base stations 1412a, 1412b, 1412c, such as NBs, eNBs, gNBs or other types of wireless access points, each defining a corresponding coverage area 1413a, 1413b, 1413c. Each base station 1412a, 1412b, 1412c is connectable to core network 1414 over a wired or wireless connection 1415. A first. UE 1491 located in coverage area 1413c is configured to wirelessly connect to, or be paged by, the corresponding base station 1412c. A second UE 1492 in coverage area 1413a is wirelessly connectable to the corresponding base station 1412a. While a plurality of UEs 1491, 1492 are illustrated in this example, the disclosed embodiments are equally applicable to a situation where a sole UE is in the coverage area or where a sole UE is connecting to the corresponding base station 1412.

Telecommunication network 1410 is itself connected to host computer 1430, which may be embodied in the hardware and/or software of a standalone server, a cloud-implemented server, and a distributed server or as processing resources in a server farm. Host computer 1430 may be under the ownership or control of a service provider, or may be operated by the service provider or on behalf of the service provider. Connections 1421 and 1422 between telecommunication network 1410 and host computer 1430 may extend directly from core network 1414 to host computer 1430 or may go via an optional intermediate network 1420. Intermediate network 1420 may be one of, or a combination of more than one of, a public, private or hosted network; intermediate network 1420, if any, may be a backbone network or the Internet; in particular, intermediate network 1420 may comprise two or more sub-networks (not shown).

The communication system of FIG. 18 as a whole enables connectivity between the connected UEs 1491, 1492 and host computer 1430. The connectivity may be described as an over-the-top (OTT) connection 1450. Host computer 1430 and the connected UEs 1491, 1492 are configured to communicate data and/or signaling via OTT connection 1450, using access network 1411, core network 1414, any intermediate network 1420 and possible further infrastructure (not shown) as intermediaries. OTT connection 1450 may be transparent in the sense that the participating communication devices through which OTT connection 1450 passes are unaware of routing of uplink and downlink communications. For example, base station 1412 may not or need not be informed about the past routing of an incoming downlink communication with data originating from host computer 1430 to be forwarded (e.g., handed over) to a connected UE 1491. Similarly, base station 1412 need not be aware of the future routing of an outgoing uplink communication originating from the UE 1491 towards the host computer 1430.

Figure 19:
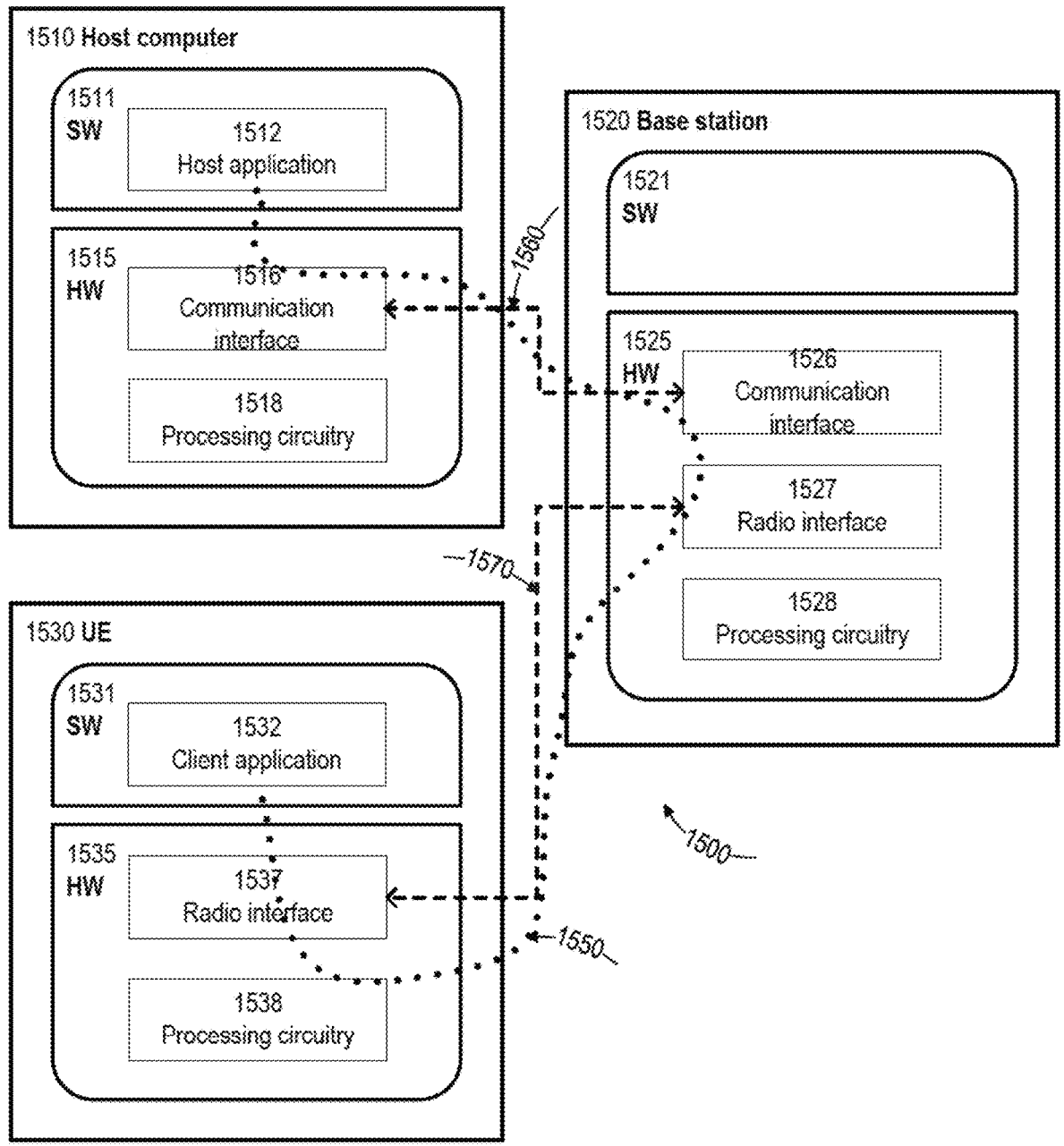
FIG. 19 illustrates an exemplary host computer communicating via a base station with a user equipment over a partially wireless connection according to an embodiment.

Example implementations, in accordance with an embodiment, of the UE, base station and host computer discussed in the preceding paragraphs will now be described with reference to FIG. 19. FIG. 19 illustrates host computer communicating via a base station with a user equipment over a partially wireless connection in accordance with some embodiments In communication system 1500, host computer 1510 comprises hardware 1515 including communication interface 1516 configured to set up and maintain a wired or wireless connection with an interface of a different communication device of communication system 1500. Host computer 1510 further comprises processing circuitry 1518, which may have storage and/or processing capabilities. In particular, processing circuitry 1518 may comprise one or more programmable processors, application-specific integrated circuits, field programmable gate arrays or combinations of these (not shown) adapted to execute instructions. Host computer 1510 further comprises software 1511, which is stored in or accessible by host computer 1510 and executable by processing circuitry 1518. Software 1511 includes host application 1512. Host application 1512 may be operable to provide a service to a remote user, such as UE 1530 connecting via OTT connection 1550 terminating at UE 1530 and host computer 1510. In providing the service to the remote user, host application 1512 may provide user data which is transmitted using OTT connection 1550.

Communication system 1500 further includes base station 1520 provided in a telecommunication system and comprising hardware 1525 enabling it to communicate with host computer 1510 and with UE 1530. Hardware 1525 may include communication interface 1526 for setting up and maintaining a wired or wireless connection with an interface of a different communication device of communication system 1500, as well as radio interface 1527 for setting up and maintaining at least wireless connection 1570 with UE 1530 located in a coverage area (not shown in FIG. 19) served by base station 1520. Communication interface 1526 may be configured to facilitate connection 1560 to host computer 1510. Connection 1560 may be direct or it may pass through a core network (not shown in FIG. 19) of the telecommunication system and/or through one or more intermediate networks outside the telecommunication system. In the embodiment shown, hardware 1525 of base station 1520 further includes processing circuitry 1528, which may comprise one or more programmable processors, application-specific integrated circuits, field programmable gate arrays or combinations of these (not shown) adapted to execute instructions. Base station 1520 further has software 1521 stored internally or accessible via an external connection.

Communication system 1500 further includes UE 1530 already referred to. Its hardware 1535 may include radio interface 1537 configured to set up and maintain wireless connection 1570 with a base station serving a coverage area in which UE 1530 is currently located. Hardware 1535 of UE 1530 further includes processing circuitry 1538, which may comprise one or more programmable processors, application-specific integrated circuits, field programmable gate arrays or combinations of these (not shown) adapted to execute instructions. UE 1530 further comprises software 1531, which is stored in or accessible by UE 1530 and executable by processing circuitry 1538.

Software 1531 includes client application 1532. Client application 1532 may be operable to provide a service to a human or non-human user via UE 1530, with the support of host computer 1510. In host computer 1510, an executing host application 1512 may communicate with the executing client application 1532 via OTT connection 1550 terminating at UE 1530 and host computer 1510. In providing the service to the user, client application 1532 may receive request data from host application 1512 and provide user data in response to the request data. OTT connection 1550 may transfer both the request data and the user data. Client application 1532 may interact with the user to generate the user data that it provides.

It is noted that host computer 1510, base station 1520 and UE 1530 illustrated in FIG. 19 may be similar or identical to host computer 1430, one of base stations 1412*a*, 1412*b*, 1412*c* and one of UEs 1491, 1492 of FIG. 18, respectively. This is to say, the inner workings of these entities may be as shown in FIG. 19 and independently, the surrounding network topology may be that of FIG. 18.

In FIG. 19, OTT connection 1550 has been drawn abstractly to illustrate the communication between host computer 1510 and UE 1530 via base station 1520, without explicit reference to any intermediary devices and the precise routing of messages via these devices. Network infrastructure may determine the routing, which it may be configured to hide from UE 1530 or from the service provider operating host computer 1510, or both. While OTT connection 1550 is active, the network infrastructure may further take decisions by which it dynamically changes the routing (e.g., on the basis of load balancing consideration or reconfiguration of the network).

Wireless connection 1570 between UE 1530 and base station 1520 is in accordance with the teachings of the embodiments described throughout this disclosure. One or more of the various embodiments improve the performance of OTT services provided to UE 1530 using OTT connection 1550, in which wireless connection 1570 forms the last segment. More precisely, the teachings of these embodiments may improve the gains realized following a handover and thereby provide benefits such as increased capacity, throughput and improved customer experience.

A measurement procedure may be provided for the purpose of monitoring data rate, latency and other factors on which the one or more embodiments improve. There may further be an optional network functionality for reconfiguring OTT connection 1550 between host computer 1510 and UE 1530, in response to variations in the measurement results. The measurement procedure and/or the network functionality for reconfiguring OTT connection 1550 may be implemented in software 1511 and hardware 1515 of host computer 1510 or in software 1531 and hardware 1535 of UE 1530, or both. In embodiments, sensors (not shown) may be deployed in or in association with communication devices through which OTT connection 1550 passes; the sensors may participate in the measurement procedure by supplying values of the monitored quantities exemplified above, or supplying values of other physical quantities from which software 1511, 1531 may compute or estimate the monitored quantities. The reconfiguring of OTT connection 1550 may include message format, retransmission settings, preferred routing etc.; the reconfiguring need not affect base station 1520, and it may be unknown or imperceptible to base station 1520. Such procedures and functionalities may be known and practiced in the art. In certain embodiments, measurements may involve proprietary UE signaling facilitating host computer 1510's measurements of throughput, propagation times, latency and the like. The measurements may be implemented in that software 1511 and 1531 causes messages to be transmitted, in particular empty or 'dummy' messages, using OTT connection 1550 while it monitors propagation times, errors etc.

Figure 20:
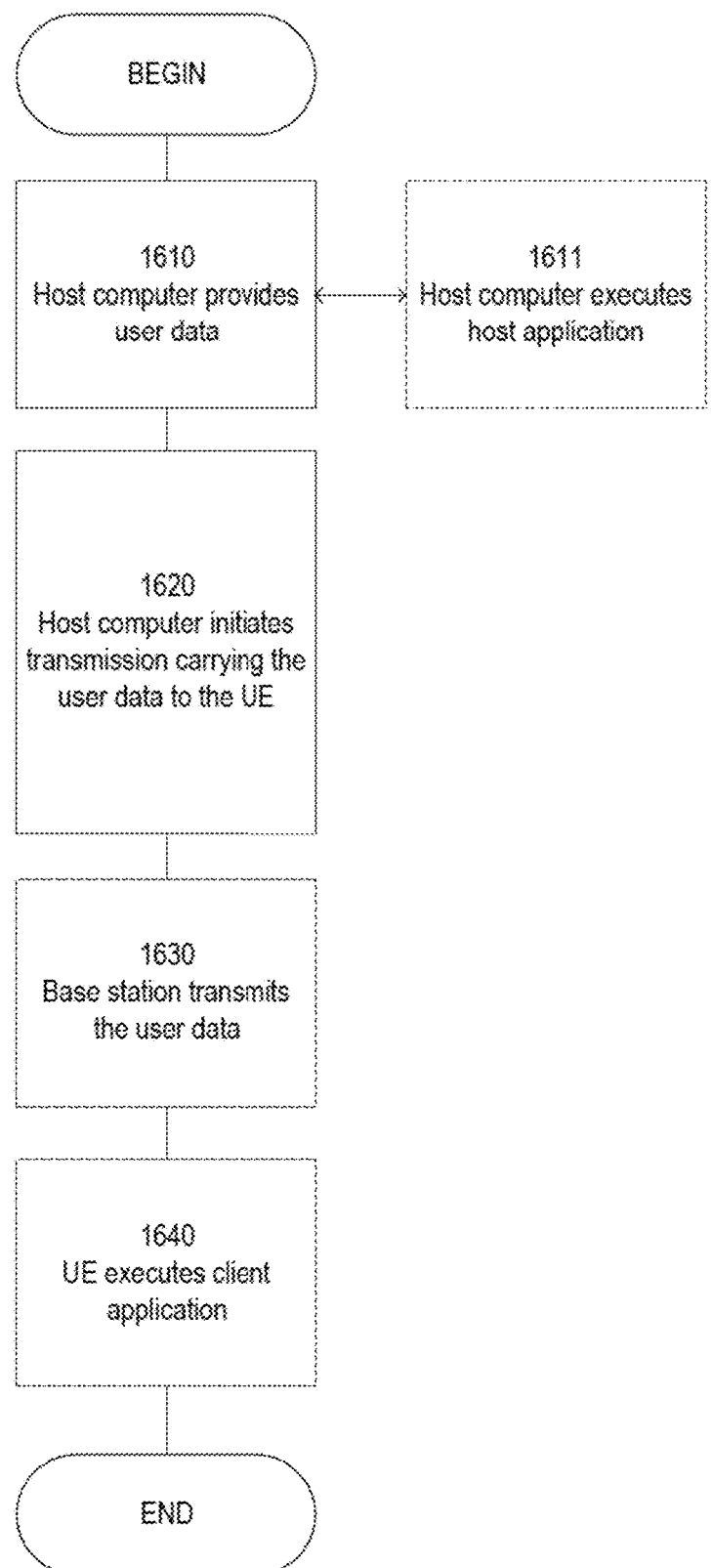
FIGS. 20-23 illustrate an exemplary methods implemented in a communication system, according to an embodiment.

FIG. 20 is a flowchart illustrating a method implemented in a communication system, in accordance with one embodiment. The communication system includes a host computer, a base station and a UE which may be those described with reference to FIGS. 18 and 19. For simplicity of the present disclosure, only drawing references to FIG. 20 will be included in this section. In step 1610, the host computer provides user data. In substep 1611 (which may be optional) of step 1610, the host computer provides the user data by executing a host application. In step 1620, the host computer initiates a transmission carrying the user data to the UE. In step 1630 (which may be optional), the base station transmits to the UE the user data which was carried in the transmission that the host computer initiated, in accordance with the teachings of the embodiments described throughout this disclosure. In step 1640 (which may also be optional), the UE executes a client application associated with the host application executed by the host computer.

Figure 21:
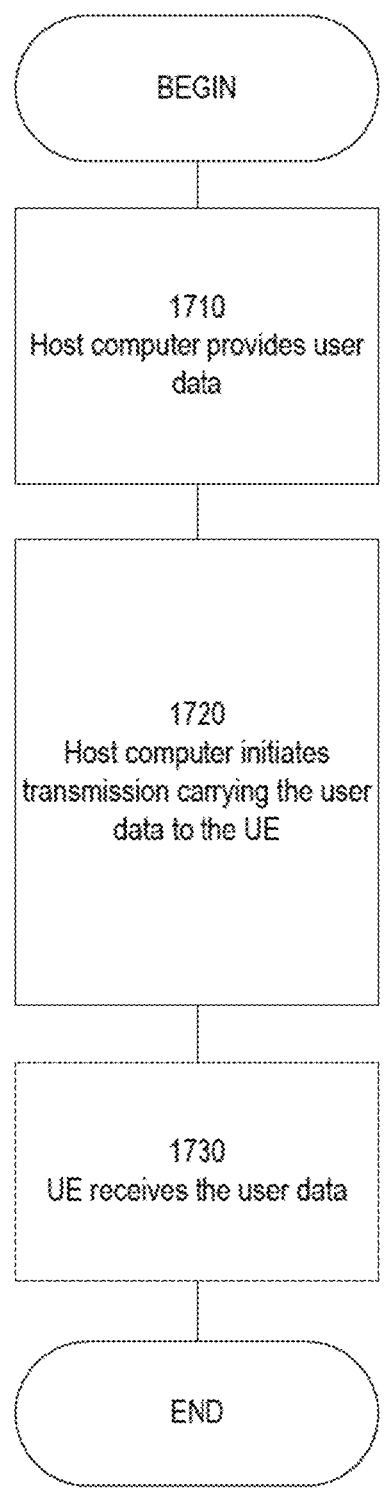

FIG. 21 is a flowchart illustrating a method implemented in a communication system, in accordance with one embodiment. The communication system includes a host computer, a base station and a UE which may be those described with reference to FIGS. 18 and 19. For simplicity of the present disclosure, only drawing references to FIG. 21 will be included in this section. In step 1710 of the method, the host computer provides user data. In an optional substep (not shown) the host computer provides the user data by executing a host application. In step 1720, the host computer initiates a transmission carrying the user data to the UE. The transmission may pass via the base station, in accordance with the teachings of the embodiments described, throughout this disclosure. In step 1730 (which may be optional), the UE receives the user data carried in the transmission.

Figure 22:
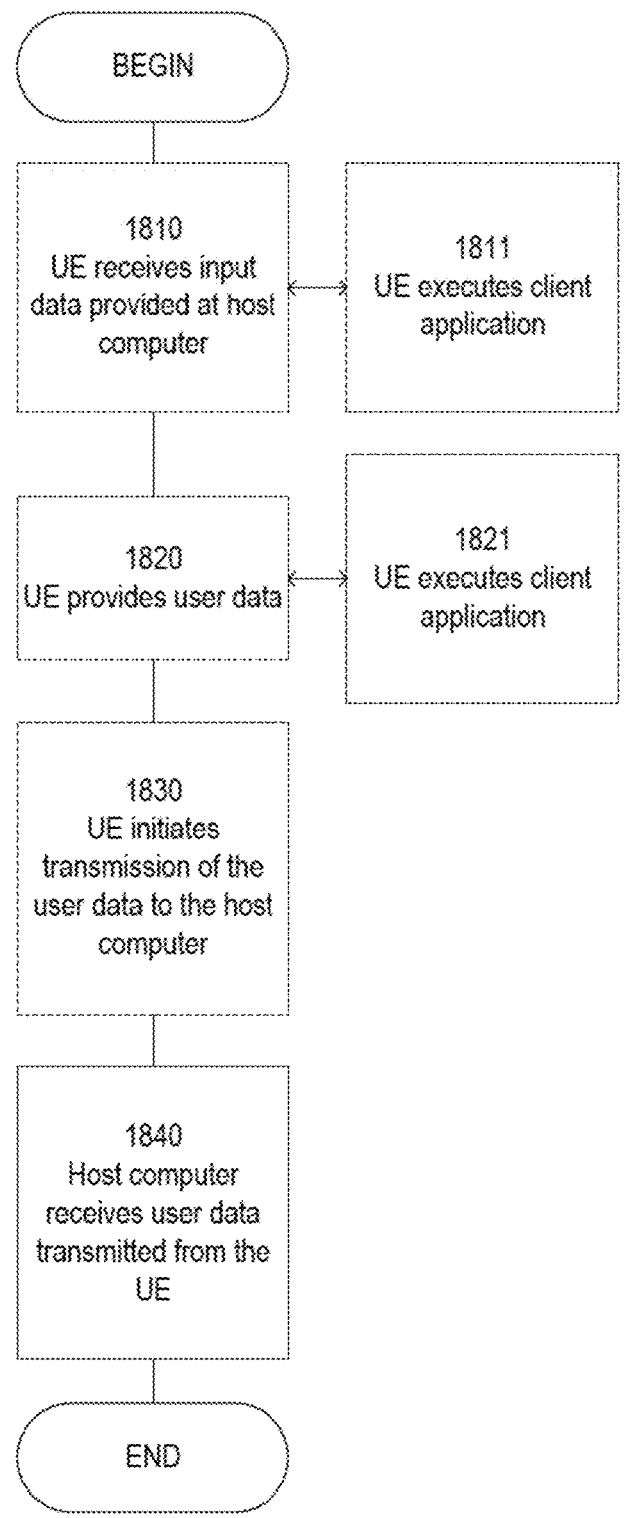

FIG. 22 is a flowchart illustrating a method implemented in a communication system, in accordance with one embodiment. The communication system includes a host computer, a base station and a UE which may be those described with reference to FIGS. 18 and 19. For simplicity of the present disclosure, only drawing references to FIG. 22 will be included in this section. In step 1810 (which may be optional), the UE receives input data provided by the host computer. Additionally or alternatively, in step 1820, the UE provides user data. In substep 1821 (which may be optional) of step 1820, the UE provides the user data by executing a client application. In substep 1811 (which may be optional) of step 1810, the UE executes a client application which provides the user data in reaction to the received input data provided by the host computer. In providing the user data, the executed client application may further consider user input received from the user. Regardless of the specific manner in which the user data was provided, the UE initiates, in substep 1830 (which may be optional), transmission of the user data to the host computer. In step 1840 of the method, the host computer receives the user data transmitted from the UE, in accordance with the teachings of the embodiments described throughout this disclosure.

Figure 23:
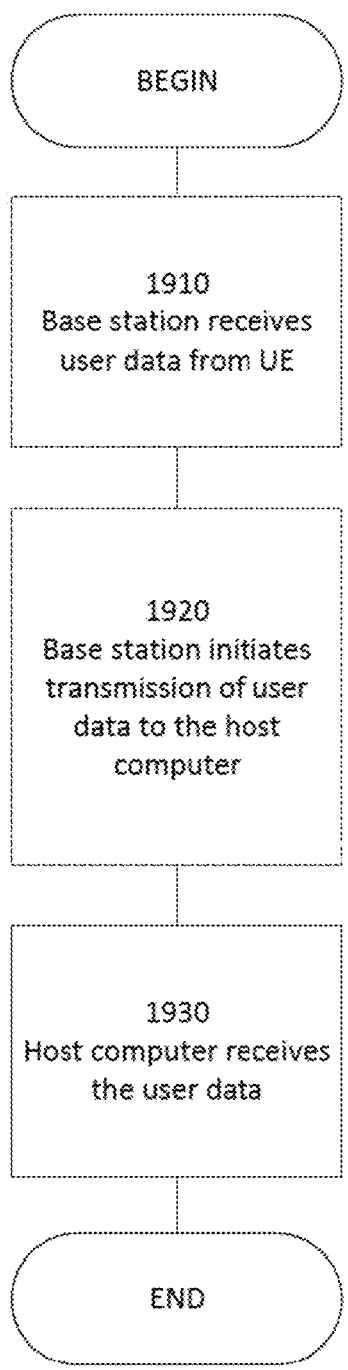

FIG. 23 is a flowchart illustrating a method implemented in a communication system, in accordance with one embodiment. The communication system includes a host computer, a base station and a UE which may be those described with reference to FIGS. 18 and 19. For simplicity of the present disclosure, only drawing references to FIG. 23 will be included in this section. In step 1910 (which may be optional), in accordance with the teachings of the embodiments described throughout this disclosure, the base station receives user data from the UE. In step 1920 (which may be optional), the base station initiates transmission of the received user data to the host computer. In step 1930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art. Additional information and embodiments may also be found in Appendix A attached hereto.]

1. A handover method implemented by a network node in a wireless communication network comprising multiple network nodes, the method comprising;
   selecting, based on a current radio environment experienced by a wireless device, a radio environment context from a plurality of stored radio environment contexts indicative of radio conditions at respective locations in the wireless communication network; and
   selecting a target network node for a handover using a mapping between the selected radio environment context and one or more candidate network nodes that are predicted, based on historical measurement data collected over time from a plurality of wireless devices, to provide the highest rewards in terms of a specified performance metric given the current radio environment context.

2. The handover method of item 16 wherein the performance metric comprises at least one of a data throughput, a signal quality, or a quality of service.

3. The handover method of item 1 or 2 wherein each of the stored radio environment contexts comprises a current serving cell and a set of one or more power measurement values associated with access beams transmitted by one or more neighboring network nodes.

4. The handover method of item 3 wherein the power measurement values comprise reference signal received power measurement values.

5. The handover method of item 3 or 4 wherein each of the stored radio environment contexts further comprises at least one of a location of the wireless device, a traffic type associated with a data transmission to or from the wireless device, a quality of service requirement of the wireless device, a speed of the wireless device, or a direction of travel of the wireless device.

6. The handover method of item 3 or 4 wherein each of the stored radio environment contexts further comprises at least one of antenna configurations of the neighboring network nodes, resource utilization of the neighboring network nodes, or carrier frequencies of the neighboring network nodes.

7. The handover method of any one of items 1-6 wherein determining the current radio environment context of a wireless device in the coverage area comprises determining the current radio environment context of a wireless device based on a measurement report received from the wireless device.

8. The handover method of any one of items 1-7 wherein selecting one of the stored radio environment contexts based on the current radio environment context of the wireless device comprises selecting a stored radio environment context that minimizes a distance metric.

9. The handover method of item 8 wherein the distance metric comprises Euclidean distance between the current radio environment context and each of the stored radio environment contexts.

10. The handover method of any one of items 1-9 wherein the candidate nodes are the neighboring network nodes predicted to provide highest link beam signal powers.

11. The handover method of any one of items 1-10 wherein the highest expected rewards are determined by applying a machine learning to the historical measurement data collected from the other wireless devices.

12. The handover method of item 11 wherein the highest expected rewards are determined by applying reinforcement learning to the historical measurement data.

13. The handover method of item 12 wherein the reinforcement learning is formulated by modeling the handover as a contextual multi-arm bandit.

14. The handover method of any one of items 1-13 further comprising sending an indication of the selected target network node to a serving base station or to the wireless device.

15. The handover method of item 14 wherein the indication is sent to the wireless device in a handover message.

16. A method implemented by a network node to support the handover of a wireless device from a source network node to a target network node, the method comprising:
   determining a plurality of radio environment contexts indicative of radio conditions at respective locations within a coverage area of the wireless communication network; and
   generating a mapping between each radio environment context and one or more of the candidate network nodes that provide the highest expected rewards in terms of a performance metric for selecting the candidate network node as a target network node for the handover given the radio environment context.

17. The handover method of item 16 wherein the performance metric comprises at least one of a data throughput, a signal quality, or a quality of se e.

The handover method of item 16 or 17 wherein the mapping is generated by applying machine learning to historical measurement data collected over time from a plurality of wireless devices.

19. The handover method of item 18 wherein the mapping is generated by applying reinforcement learning to the historical measurement data.

20. The handover method of item 19 wherein the reinforcement learning is formulated by modeling the handover as a contextual multi-arm bandit.

21. The handover method of any one of items 16-21 wherein each of the plurality of radio environment contexts comprises a current serving cell and a set of one or more power measurement values associated with access beams transmitted by one or more neighboring network nodes.

22. The handover method of item 21 wherein the power measurement values comprise reference signal received power measurement values.

23. The handover method of item 21 or 22 wherein each of the plurality of radio environment contexts further comprises at least one of a location of the wireless device, a traffic type of a data transmission to or from the wireless device, a quality of service requirement of the wireless device, a speed of the wireless device, or a direction of travel of the wireless device.

24. The handover method of any one of items 16-21 wherein each of the plurality of radio environment contexts further comprises at least one of antenna configurations of the neighboring network nodes, resource utilization of the neighboring network nodes, or carrier frequencies of the neighboring network nodes.

25. The handover method of any one of items 21-24 wherein the candidate nodes are the neighboring network nodes predicted to provide highest link beam signal powers.

26. A network node in a wireless communication network comprising multiple network nodes, the network node being configured to:
    select, based on a current radio environment experienced by a wireless device, a radio environment context from a plurality of stored radio environment contexts indicative of radio conditions at respective locations in the wireless communication network; and
    select a target network node for a handover using a mapping between the selected radio environment context and one or more candidate network nodes that are predicted, based on historical measurement data collected over time from a plurality of wireless devices, to provide the highest rewards in terms of a specified performance metric given the current radio environment context 27. The network node of items 26 configured to perform the method of any one of items 2-15.

28. A network node in a wireless communication network comprising:
    communication circuits for communicating with other network nodes in the wireless communication network: and
    a processing circuit configured to:
        select, based on a current radio environment experienced by a wireless device, a radio environment context from a plurality of stored radio environment contexts indicative of radio conditions at respective locations in the wireless communication network; and
        select a target network node for a handover using a mapping between the selected radio environment context and one or more candidate network nodes that are predicted, based on historical measurement data collected over time from a plurality of wireless devices, to provide the highest rewards in terms of a specified performance metric given the current radio environment context.

29. The network node of items 28 wherein the processing circuit is further configured to perform the method of any one of items 2-15.

30. A network node in a wireless communication network comprising multiple network nodes, the network node being configured to:
    determine a plurality of radio environment contexts indicative of radio conditions at respective locations within a coverage area of the wireless communication network; and
    generate a mapping between each radio environment context and one or more of the candidate network nodes that provide the highest expected rewards in terms of a performance metric for selecting the candidate network node as a target network node for the handover given the radio environment context.

31. The network node of item 30 configured to perform the method of any one of items 17-25.

32. A network node in a wireless communication network comprising:
    communication circuits for communicating with other network nodes in the wireless communication network: and
    a processing circuit configured to:
        determine a plurality of radio environment contexts indicative of radio conditions at respective locations within a coverage area of the wireless communication network; and
        generate a mapping between each radio environment context and one or more of the candidate network nodes that provide the highest expected rewards in terms of a performance metric for selecting the candidate network node as a target network node for the handover given the radio environment context.

33. The network node of item 32 wherein the processing circuit is further configured to perform the method of any one of items 17-25.

34. A computer program comprising executable instructions that, when executed by a processing circuit in a network node in a wireless communication network (10), causes the network node to perform any one of the methods of items 1-25.

35. A carrier containing a computer program of item 34, wherein the carrier is one of an electronic signal, optical signal, radio signal, or computer readable storage medium.

36. A non-transitory computer-readable storage medium containing a computer program comprising executable instructions that, when executed by a processing circuit in a network node in a wireless communication network causes the network node to perform any one of the methods of items 1-25.

37. A base station configured to perform any of the steps of any of the Group B items.

38. A base station comprising:
    processing circuitry configured to perform any the steps of any one of items 1 25;
    power supply circuitry configured to supply power to the wireless device.

39. A base station comprising:
    processing circuitry and memory, the memory containing instructions executable by the processing circuitry whereby the base station is configured to perform any of the steps of any one of items 1-25.

40. A computer program comprising instructions which, when executed by at least one processor of a base station, causes the base station to carry out the steps of any one of items 1-25.

41. A carrier containing the computer program of item C1040 wherein the carrier is one of an electronic signal, optical signal, radio signal, or computer readable storage medium.

42. A communication system including a host computer comprising:
    processing circuitry configured to provide user data; and
    a communication interface configured to forward the user data to a cellular
    network for transmission to a user equipment (UE), wherein the cellular network comprises a base station having a radio interface and processing circuitry, the base station's processing circuitry configured to perform any of the steps of any one of items 1-25.

43. The communication system of the item 42 further including the base station.

The communication system of items, 42 or 43 further including the UE, wherein the UE is configured to communicate with the base station.

45. The communication system of any one of items 42-44, wherein:
the processing circuitry of the host computer is configured to execute a host application, thereby providing the user data; and
the UE comprises processing circuitry configured to execute a client application associated with the host application.

46. A method implemented in a communication system including a host computer, a base station and a user equipment (UE), the method comprising:
at the host computer, providing user data; and at the host computer, initiating a transmission carrying the user data to the UE via a cellular network comprising the base station, wherein the base station performs any of the steps of any one of items 1-25.

47. The method of the previous item, further comprising, at the base station, transmitting the user data.

48. The method of items 45 or 46, wherein the user data is provided at the host computer by executing a host application, the method further comprising, at the UE, executing a client application associated with the host application.

49. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of item 1-25.

50. The communication system of item 49 further including the base station.

51. The communication system of items 49 or 50, further including the UE, wherein the UE is configured to communicate with the base station.

52. The communication system of items 49-51, wherein:
the processing circuitry of the host computer is configured to execute a host application;
the UE is configured to execute a client application associated with the host application, thereby providing the user data to be received by the host computer.

What is claimed is:

1. A method implemented by a network node in a wireless communication network comprising multiple network nodes, the method comprising:
selecting, based on current radio environment conditions experienced by a wireless device, a radio environment context from a plurality of stored radio environment contexts indicative of radio conditions at respective locations in the wireless communication network, the selecting of the radio environment context being based on minimizing, using a Q-table comprising the plurality of stored radio environment contexts, a distance metric between the current radio environment conditions and each of the stored radio environment contexts in the Q-table, the radio environment context being a closest one of the stored radio environment contexts;
selecting a target network node for a handover using a mapping between the selected radio environment context and one or more candidate network nodes that are predicted, based on historical measurement data collected over time from a plurality of wireless devices, to provide the highest expected rewards in terms of a performance metric given the selected radio environment context; and
causing the handover of the wireless device to the target network node.

2. The method of claim 1, wherein each of the stored radio environment contexts comprises a current serving cell and a set of one or more power measurement values associated with access beams transmitted by one or more neighboring network nodes.

3. The method of claim 2, wherein each of the stored radio environment contexts further comprises at least one from a group consisting of a location of the wireless device, a traffic type associated with a data transmission to or from the wireless device, a quality of service requirement of the wireless device, a speed of the wireless device, and a direction of travel of the wireless device.

4. The method of claim 2, wherein each of the stored radio environment contexts further comprises at least one selected from a group consisting of antenna configurations of the one or more neighboring network nodes, resource utilization of the one or more neighboring network nodes, and carrier frequencies of the one or more neighboring network nodes.

5. The method of claim 1, further comprising determining the current radio environment conditions of the wireless device based on a measurement report received from the wireless device.

6. The method of claim 1, wherein the one or more candidate network nodes are the neighboring network nodes predicted to provide highest link beam signal powers.

7. The method of claim 1, wherein the highest expected rewards are determined by applying a machine learning to the historical measurement data collected from the plurality of wireless devices.

8. The method of claim 1, further comprising sending an indication of the selected target network node to a serving base station or to the wireless device.

9. A method implemented by a network node to support handover of a wireless device from a source network node to a target network node, the method comprising:
determining a plurality of radio environment contexts indicative of radio conditions at respective locations within a coverage area of a wireless communication network, the radio environment contexts being configured for minimizing, using a Q-table comprising the plurality of stored radio environment contexts, of a distance metric between current radio environment conditions experienced by the wireless device and each of the radio environment contexts in the Q-table, the radio environment context being a closest one of the stored radio environment contexts;
generating a mapping between each of the radio environment contexts and one or more candidate network nodes that provide the highest expected rewards in terms of a performance metric for selecting one of the one or more candidate network nodes as a target network node for the handover given one of the radio environment contexts; and
transmitting the mapping to the source network node for use by the source network node in a handover of the wireless device to the target network node.

10. The method of claim 9, wherein the performance metric comprises at least one of a group consisting of a data throughput, a signal quality, and a quality of service.

11. The method of claim 9, wherein the mapping is generated by applying machine learning to historical measurement data collected over time from a plurality of wireless devices.

12. The method of claim 11, wherein the mapping is generated by applying reinforcement learning to the historical measurement data.

13. The method of claim 12, wherein the reinforcement learning is formulated by modeling the handover as a contextual multi-arm bandit.

14. The method of claim 9, wherein each of the plurality of radio environment contexts comprises a current serving cell and a set of one or more power measurement values associated with access beams transmitted by one or more neighboring network nodes.

15. The method of claim 14, wherein each of the plurality of radio environment contexts further comprises at least one from a group consisting of a location of the wireless device, a traffic type of a data transmission to or from the wireless device, a quality of service requirement of the wireless device, a speed of the wireless device, and a direction of travel of the wireless device.

16. The method of claim 14, wherein each of the plurality of radio environment contexts further comprises at least one from a group consisting of antenna configurations of the one or more neighboring network nodes, resource utilization of the one or more neighboring network nodes, and carrier frequencies of the one or more neighboring network nodes.

17. The method of claim 9, wherein the one or more candidate nodes are the neighboring network nodes predicted to provide highest link beam signal powers.

18. A network node for a wireless communication network comprising multiple network nodes, the network node being configured to:
  select, based on current radio environment conditions experienced by a wireless device, a radio environment context from a plurality of stored radio environment contexts indicative of radio conditions at respective locations in the wireless communication network, the selection of the radio environment context being based on minimizing, using a Q-table comprising the plurality of stored radio environment contexts, a distance metric between the current radio environment conditions and each of the stored radio environment contexts in the Q-table, the radio environment context being a closest one of the stored radio environment contexts;
  select a target network node for a handover using a mapping between the selected radio environment context and one or more candidate network nodes that are predicted, based on historical measurement data collected over time from a plurality of wireless devices, to provide the highest expected rewards in terms of a performance metric given the selected radio environment context; and
  cause the handover of the wireless device to the target network node.

19. A network node for a wireless communication network comprising multiple network nodes, the network node being configured to:
  determine a plurality of radio environment contexts indicative of radio conditions at respective locations within a coverage area of the wireless communication network, the radio environment contexts being configured for minimizing, using a Q-table comprising the plurality of stored radio environment contexts, of a distance metric between current radio environment conditions experienced by the wireless device and each of the radio environment contexts in the Q-table, the radio environment context being a closest one of the stored radio environment contexts;
  generate a mapping between each of the radio environment contexts and one or more candidate network nodes that provide the highest expected rewards in terms of a performance metric for selecting one of the one or more candidate network nodes as a target network node for handover given one of the radio environment contexts; and
  transmitting the mapping to a source network node for use by the source network node in the handover of a wireless device to the target network node.

* * * * *